US008951120B2

(12) United States Patent
Seegers et al.

(10) Patent No.: US 8,951,120 B2
(45) Date of Patent: Feb. 10, 2015

(54) SYSTEMS AND METHODS FOR CALIBRATION AND BIASING FOR GAME CONTROLLER

(75) Inventors: Michael Seegers, Los Angeles, CA (US); Mark Ming-lun Tsai, Playa del Rey, CA (US); Jeff Scott Dixon, Los Angeles, CA (US); Sean Hyde-Moyer, Redwood City, CA (US); Deborah Mars, Santa Monica, CA (US); Nathan Gary, Santa Monica, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 99 days.

(21) Appl. No.: 13/610,699

(22) Filed: Sep. 11, 2012

(65) Prior Publication Data
US 2013/0072297 A1 Mar. 21, 2013

Related U.S. Application Data

(60) Provisional application No. 61/536,548, filed on Sep. 19, 2011.

(51) Int. Cl.
*A63F 13/00* (2014.01)
*A63F 13/20* (2014.01)
(52) U.S. Cl.
CPC .......... *A63F 13/06* (2013.01); *A63F 2300/1018* (2013.01); *A63F 2300/105* (2013.01); *A63F 2300/1093* (2013.01)
USPC .................... 463/37; 463/36; 463/38; 463/39
(58) Field of Classification Search
USPC .................................................... 463/36–39
See application file for complete search history.

(56) References Cited

U.S. PATENT DOCUMENTS

| 6,086,236 | A  | * | 7/2000 | De Raad et al. | ................. 700/28 |
|---|---|---|---|---|---|
| 7,690,988 | B2 |  | 4/2010 | Kaido et al. | |
| 8,062,126 | B2 |  | 11/2011 | Marks et al. | |
| 8,221,229 | B2 |  | 7/2012 | Mikhailov et al. | |
| 8,287,373 | B2 |  | 10/2012 | Marks et al. | |
| 8,323,106 | B2 |  | 12/2012 | Zalewski | |
| 2008/0220780 | A1 | * | 9/2008 | Huseth et al. | ................. 455/436 |
| 2009/0280901 | A1 | * | 11/2009 | Casparian et al. | .............. 463/37 |

(Continued)

OTHER PUBLICATIONS

Dnadns, "Guide: Killzone 3 on The Move", Feb. 11, 2011, killzone.com, <http://community.killzone.com/t5/Killzone-3-PS3/Guide-Killzone-3-on-The-Move/td-p/676667>.*

(Continued)

*Primary Examiner* — Justin Myhr
(74) *Attorney, Agent, or Firm* — Martine Penilla Group, LLP

(57) ABSTRACT

Systems and methods for calibration and biasing are described herein. In one example, a method for determining a playing height of a user is described. The method includes receiving an identification of a first corner of a display screen from the user by associating a first position of a tracked object with the first corner using image data from a capture device, receiving an identification of a second corner of the display screen from the user by associating a second position of the tracked object with the second corner using image data from the capture device, and triangulating between the first and second corners and the tracked object to define a range of movement made by the user. The tracked object is held by the user. The method further includes defining a height at which the tracked object is held by the user based on the range of movement.

10 Claims, 15 Drawing Sheets

(56) References Cited

U.S. PATENT DOCUMENTS

| | | |
|---|---|---|
| 2009/0298590 A1 | 12/2009 | Marks et al. |
| 2010/0105475 A1 | 4/2010 | Mikhailov et al. |
| 2011/0095980 A1* | 4/2011 | Sweetser et al. .............. 345/158 |
| 2011/0242060 A1* | 10/2011 | McGibney et al. ........... 345/179 |
| 2012/0289334 A9 | 11/2012 | Mikhailov et al. |

OTHER PUBLICATIONS

Sid Shuman, "PlayStation Move: The Ultimate FAQ", Sep. 7, 2010, blog.us.playstation.com,<http://blog.us.playstation.com/2010/09/07/playstation-move-the-ultimate-faq/>.*

Christopher Ingram: "Guides: How to Be Better with PlayStation Move in Killzone3", URL: http://www.pushsquare.com/news/2011/02/guides_how_to_be_better_with_playstation_move_in-killzone_3, Feb. 11, 2011, pp. 1-3.

Terryxmasters, "Playstation Move Calibration Problem—Killzone 3", video, URL: http://www.youtube.com/watch?v+kXpbT68wYsc, Feb. 25, 2011.

PCT International Search Report and Written Opinion of the International Searching Authority (ISA) issued in International Application No. PCT/US2012/055576, European Patent Office, Sep. 18, 2013.

* cited by examiner

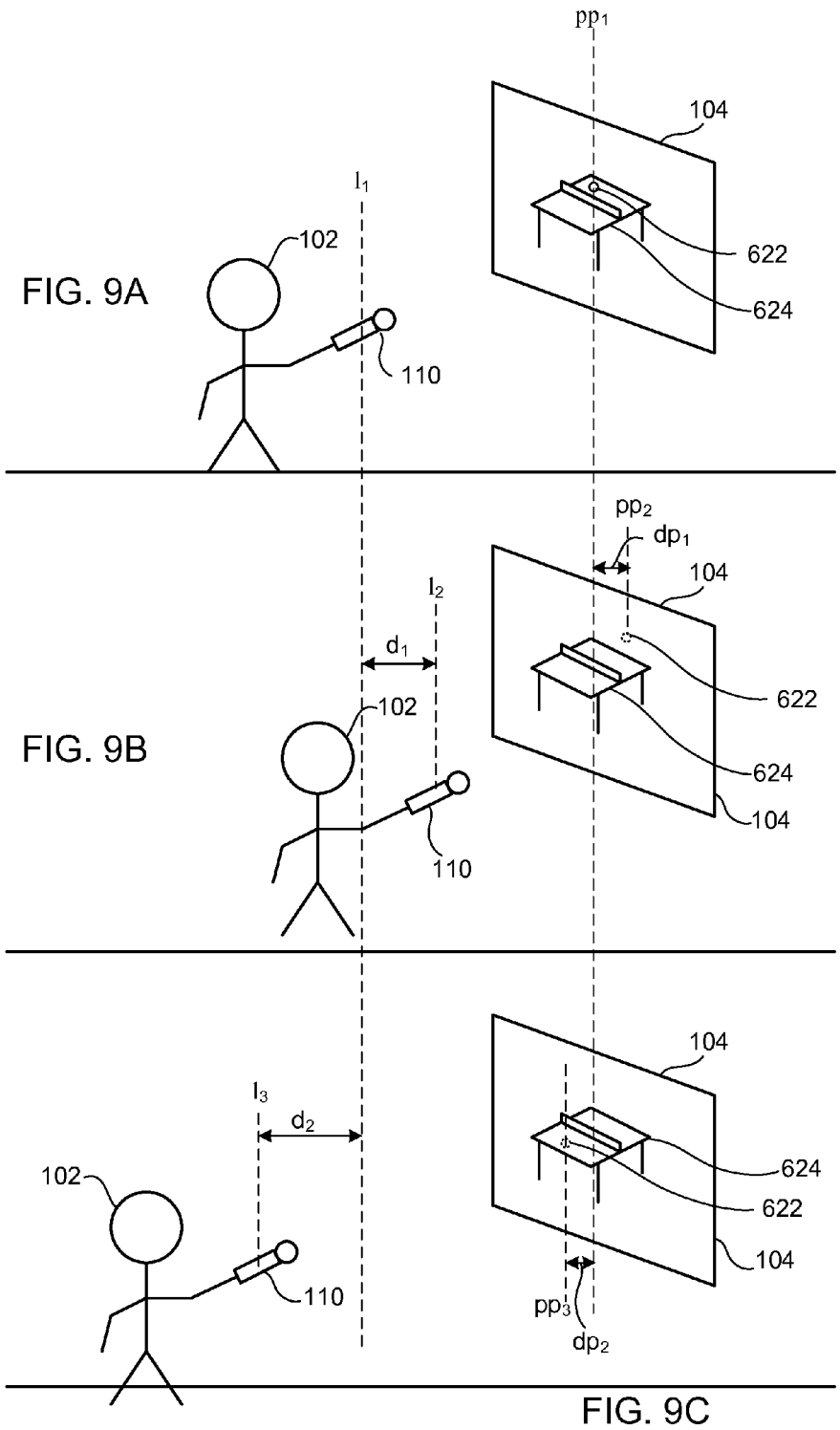

SYSTEMS AND METHODS FOR CALIBRATION AND BIASING FOR GAME CONTROLLER

CLAIM OF PRIORITY

This application claims the benefit of and priority to, under 35 U.S.C. 119 §(e), to U.S. Provisional Patent Application No. 61/536,548, filed on Sep. 19, 2011, and titled "Systems and Methods for Calibration and Biasing for Game Controller", which is hereby incorporated by reference in its entirety.

FIELD

The present invention relates to methods and systems for calibrating and biasing a controller for controlling a position of a tracked object.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony PlayStation®, Sony PlayStation2® (PS2), and Sony PlayStation3® (PS3), each of which is sold in the form of a game console. As is well known, the game console is designed to connect to a monitor (usually a television) and enable user interaction through handheld controllers. The game console is designed with specialized processing hardware, including a central processing unit (CPU), a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements, and use these movements as inputs for the game.

It is in this context that embodiments of the invention arise.

SUMMARY

Embodiments of the present invention provide systems and methods for calibration and biasing are described herein.

Broadly speaking, the embodiments of the present invention provide various calibration and biasing adjustments to a user's movement and actions with a game controller. In one example, the game controller is a motion controller that includes an identifiable object attached to the motion controller. A system for interfacing with the game controller includes a computing system (e.g., a game console) and a camera that captures images in front of a display. During game play, a user interfaces with objects that are rendered on the display. The interfacing includes having the user make various motions with the game controller, in three dimensional space, in front of the display. The motions, combined with any user input of buttons of the game controller enable precise control to the user to interface with objects, select objects, and provide interfacing commands to the system software or game software executed on the computing system. During game play, certain game programs prompt the user to conduct various motions that are translated to the game environment. These motions can include, for instance, tossing a ball, picking up objects, moving objects, selecting objects, etc.

In accordance with one embodiment, a method is provided to enable initial calibration of the user's physical dimensions to provide more play comfort to the user during interactive play. An embodiment of the method includes identifying a position of a tracked object in front of a display device and prompting a user to identify two or more corners of the display and a center of the display. The method further includes receiving an identification of the center from the user, receiving an identification of a first corner from the user, and receiving an identification of a second corner from the user. The method includes establishing a position of a capture device relative to the display using the identification of the center. The method also includes triangulating between the first and second corners and the tracked object to define a range of movement made by the user. The method includes defining a comfortable height of the tracked object based on the range of movement. It should be noted that although the method is performed within a game, active game play does not occur during the performance of the method. For example, the calibration of the comfortable height may be associated with a game of ping pong but not performed while a play of the ping pong is executed.

In another embodiment, a method is provided that enables dynamic adjustment of calibration parameters during game play, without having to initiate a new calibration procedure. The dynamic adjustment of calibration parameters is processed during active game play, such as during the completion of game play activity. Thus, normal game play activity is detected and analyzed to ascertain if the initial calibration should be adjusted. It should be noted, however, that this adjustment in calibration is transparent to the user, and does not interfere with normal game play actions.

An embodiment of the method includes displaying a first image during active game play and receiving a first position of a tracked object from a user. The first position is generated when the user points towards the first image. The method further includes generating a first cursor position based on the first position, determining a first difference between the first cursor position and a position of the first image, displaying a second image during the active game play, and receiving a second position of the tracked object from the user. The second position is generated when the user points towards the second image. The method includes generating a second cursor position based on an application of the difference to a location of the second image. In this embodiment, the difference can be thought of as a bias.

In still another embodiment, the adjustment of calibration parameters can take place automatically after a second user of different physical size takes over game play from a first user, where the first user was the one that completed the initial calibration. In this example, as the second user continues to play the game, the method will analyze the position of one or more moves conducted while interfacing with normal game play. This analysis is used to make adjustments to the calibration, without requiring the second user to conduct an initial calibration. This adjustment in calibration is, in one embodiment, described to be a bias in the calibration, that provides for more comfortable game play and more accurate interactivity.

In another embodiment, a method is provided to analyze a user's interactivity during game play, and based on the interactivity, place adjustment biases that will improve the user's game performance. These adjustments in bias can be selected based on analysis of specific movements, positions in movements in space, physical movements of the user relative to the display, or combinations thereof. As noted above, in one embodiment, these adjustments in bias are dynamically applied during game play, which provides for improvements in interfacing control and game accuracy for users.

One embodiment of the method includes determining whether a tracked object is located at a reference line or away from the reference line. The tracked object is held by a user in front of a camera. The user may side-step from the reference line or move forward or backward with respect to the reference line. The method further includes applying a bias to a cursor displayed on a display screen in response to determining that the tracked object is located away from the reference line.

In one embodiment, a method includes determining whether a user performs an underarm or an overarm motion based on a position of a tracked object with respect to a reference line. In another embodiment, a method includes ignoring one or more bounces of a tracked object to determine whether an underarm or overarm motion is performed with the tracked object.

In one embodiment, a method includes receiving an identification of a first corner of a display screen from the user by associating a first position of a tracked object with the first corner using image data from a capture device, receiving an identification of a second corner of the display screen from the user by associating a second position of the tracked object with the second corner using image data from the capture device, and triangulating between the first and second corners and the tracked object to define a range of movement made by the user. The tracked object is held by the user. The method further includes defining a height at which the tracked object is held by the user based on the range of movement. The method is executed by a processor.

In an embodiment, a method includes generating data to display an image at a location on a display screen and receiving data regarding a location of a cursor on the display screen. The data regarding the cursor location is received when a user points a tracked object toward the image. The method also includes determining an error between the image location and the cursor location and associating the error with a location at which a tracked object is held by a user. The location at which the tracked object is held includes a displacement from a reference location. The method includes generating data to display another image at a location on a display screen and receiving data regarding another location of the cursor on the display screen. The data regarding the other cursor location is received when a user points the tracked object toward the other image. The method includes generating data regarding adjusting the other cursor location based on the error. The method is executed by a processor.

In an embodiment, a method includes receiving data regarding a motion the tracked object. The motion data includes data regarding a pickup object location, data collected after reaching the pickup object location and data collected until a release location is reached. An image is held using the tracked object after the pickup object location is reached and is released after the release location is reached. The method further includes determining multiple criteria related to the motion. A first one of the criteria is determined based on the pickup object location of the tracked object and a second one of the criteria is determined based on multidirectional movement of the tracked object. The method includes assigning predetermined weights to the criteria, determining whether a sum of the criteria with the assigned weights exceeds a threshold, determining that the overarm motion has occurred in response to determining that the sum exceeds the threshold, and determining that the underarm motion has occurred in response to determining that the sum is less than the threshold.

In an embodiment, a method for determining a playing height of a user is described. The method includes identifying a position of a tracked object in front of a display screen and generating data regarding prompting the user to identify two or more corners of the display screen and a center of the display screen. The two or more corners include a first corner and a second corner. The method further includes receiving an identification of the center of the display screen from the user, establishing a position of a capture device relative to the display screen using the identification of the center, and receiving an identification of a first corner of a display screen from the user by associating a first position of the tracked object with the first corner using image data from a capture device. The method further includes receiving an identification of a second corner of the display screen from the user by associating a second position of the tracked object with the second corner using image data from the capture device, triangulating between the first and second corners and the tracked object to define a range of movement made by the user, and defining a height at which the tracked object is held by the user based on the range of movement. The method is executed by a processor.

Other aspects of the invention will become apparent from the following detailed description, taken in conjunction with the accompanying drawings, illustrating by way of example the principles of embodiments of the invention.

BRIEF DESCRIPTION OF THE DRAWINGS

Various embodiments of the present invention may best be understood by reference to the following description taken in conjunction with the accompanying drawings in which:

FIG. 9A is an isometric view of a gaming environment to illustrate an application of bias based on a relation between depth and strength, in accordance with one embodiment of the present invention.

FIG. 9B is an isometric view of a gaming environment to illustrate an application of bias based on a relation between depth and strength when a user moves forward compared to a position shown in FIG. 9A, in accordance with one embodiment of the present invention.

FIG. 9C is an isometric view of a gaming environment to illustrate an application of bias based on a relation between depth and strength when a user moves back compared to a position shown in FIG. 9A, in accordance with one embodiment of the present invention.

DETAILED DESCRIPTION

Systems and methods for calibration and biasing are described. It should be noted that various embodiments of the present invention may be practiced without some or all of these specific details. In other instances, well known process operations have not been described in detail in order not to unnecessarily obscure various embodiments of the present invention.

In one embodiment, the system includes a computer, a controller, and a display. In various embodiments, the computer may be a general purpose computer, a special purpose computer, a gaming console, or other such device which executes an interactive program that is rendered on a display. Examples of gaming consoles as are known in the art include those manufactured by Sony Computer Entertainment, Inc. and other manufacturers. The display may be a television, a monitor, a projector display, or other such displays and display systems which are capable of receiving and rendering video output from the computer. A user provides input to the interactive program by operating a controller. In a preferred embodiment, the controller communicates wirelessly with the computer, as this provides for greater freedom of movement of the controller than a wired connection. The controller may include any of various features for providing input to the interactive program, such as buttons, a joystick, directional pad, trigger, touchpad, touchscreen, or other types of input mechanisms. One example of a controller is the Sony Dualshock 3 controller manufactured by Sony Computer Entertainment, Inc.

Furthermore, the controller may be a motion controller that enables the user to interface with and provide input to the interactive program by moving the controller. One example of a motion controller is the PlayStation Move™ controller, manufactured by Sony Computer Entertainment, Inc. Various technologies may be employed to detect the position and movement of a motion controller. For example, a motion controller may include various types of motion detection hardware, such as accelerometers, gyroscopes, and magnetometers. In some embodiments, a motion controller can include one or more cameras which captures images of a fixed reference object. The position and movement of the motion controller can then be determined through analysis of the images captured by the one or more cameras. In some embodiments, a motion controller may include an illuminated element which is tracked via a camera having a fixed position.

Figure 1:
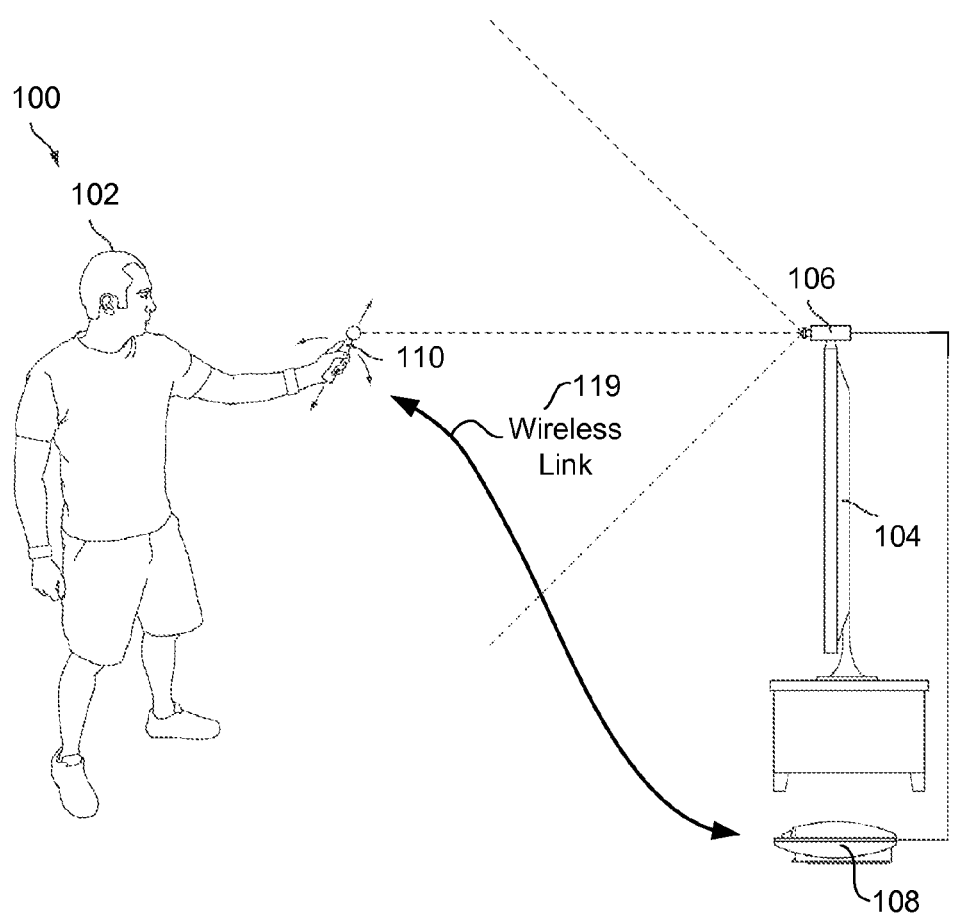
FIG. 1 illustrates a game environment, for interfacing with a computer, in accordance with one embodiment of the present invention.

FIG. 1 illustrates a game environment 100, for interfacing with a computer 108, in accordance with one embodiment of the present invention. As shown, user 102 is interfacing with the computer 108 that may be executing an interactive program being rendered on display 104. In this embodiment, an image capture device 106 is shown located proximate to the display 104, and directed toward the game environment 100. User 102 is therefore presented in the game environment 100 and captured by the image capture device 106 during interactivity with a program executed at computer 108. In this embodiment, user 102 is shown wearing a tracked object 110.

Tracked object 110 is a controller device having an identifiable shape that can be tracked by the image capture device 106 and computer 108. Tracked object 110 can be tracked for position in three dimensional space (X, Y, Z), and can also be tracked for inertial motion to identify yaw, tilt, and roll, and general orientation. In this embodiment, the tracking can occur by detecting the tracked object by the image capture device 106, or by transmitting position and motion data from the electronics of the object (e.g., positional and inertial data), forwarded to the computer 108 as position and motion data, or a combination of both. In both cases, tracking will render "position and motion data" that is obtained by the computer 108. For more information regarding method for following tracked object 110, reference may be made to U.S. patent application Ser. No. 13/209,990, filed on Aug. 12, 2011, and U.S. Patent Application Publication No. 2010-0105475, filed on Oct. 27, 2008 and published on Apr. 29, 2010, both of which are herein incorporated by reference.

Although detailed description is provided regarding a gaming environment, it is envisioned that the interfacing can also take place during interactive communication with a computer system. The computer system can be a general computer, with a graphical user interface that allows user 102 present and make gestures in space, that control icons, entry, selection, text, and other commands.

Figure 2:
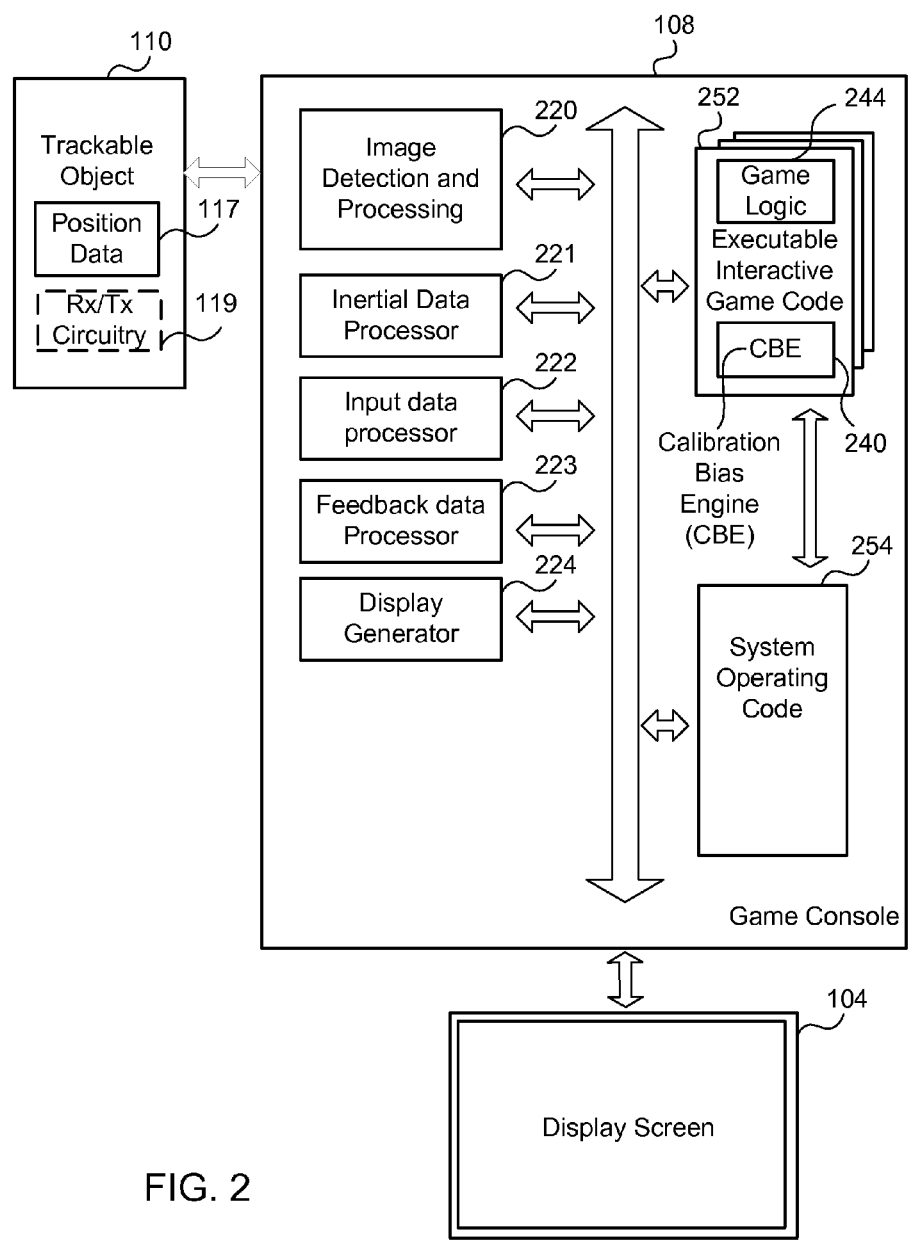
FIG. 2 illustrates a block diagram of a game console, generically, a computer system, that enables communication with a tracked object and that includes a calibration and bias engine, in accordance with one embodiment of the present invention.

FIG. 2 illustrates a block diagram of a game console, generically, a computer system, that enables communication with a tracked object 110. Tracked object 110 will produce position data 117 and data that is communicated and received by Rx/Tx circuitry 119.

In this example, computer 108 will include various computing systems and subsystems, including processors, memory, communication ports, and other circuitry. In one example, computer 108 will include image detection and processing logic 220, inertial data processing logic 221, input data processing logic 222, feedback data processing logic 223, display generator logic 224, an executable interactive game code 252, and a system operating code 254, each of which is executed by one or more processors.

The executable interactive game code 252 includes Game Logic 244 and a Calibration Bias Engine (CBE) 240. CBE 240 is executed to calibrate a position and motion of the tracked object 110 based on the position data and/or inertial data. Moreover, the CBE 240 is executed to generate a bias based on the calibration and apply a bias to a cursor during game play. Broadly speaking, as used herein, a "cursor" represents some identifiable object, shape, avatar, or indicator that may be displayed on display screen, and its position and/or motion can be defined by a position and/or motion of the tracked object 110.

Further shown is the computer 108 being interfaced with a display screen 104, which renders the interactive images provided by computer 108. The display screen 104 can be used to render images of the user during interactivity. In another embodiment, an image of the user himself/herself will be shown on the display screen 104, providing real-time movements. In yet another embodiment, an avatar of the user, or controlled by the user will be rendered making moves similar to those being made by the user. The avatar of the user or avatar controlled by the user can therefore interact in the interactive space, and interact with graphics and shapes provided by the computer system. In another embodiment, the avatar of the user, or the user, can interact with other users, and feedback can be provided to the user by way of sensors that trigger based on interactivity between various users in the interactive space.

Figure 3A:
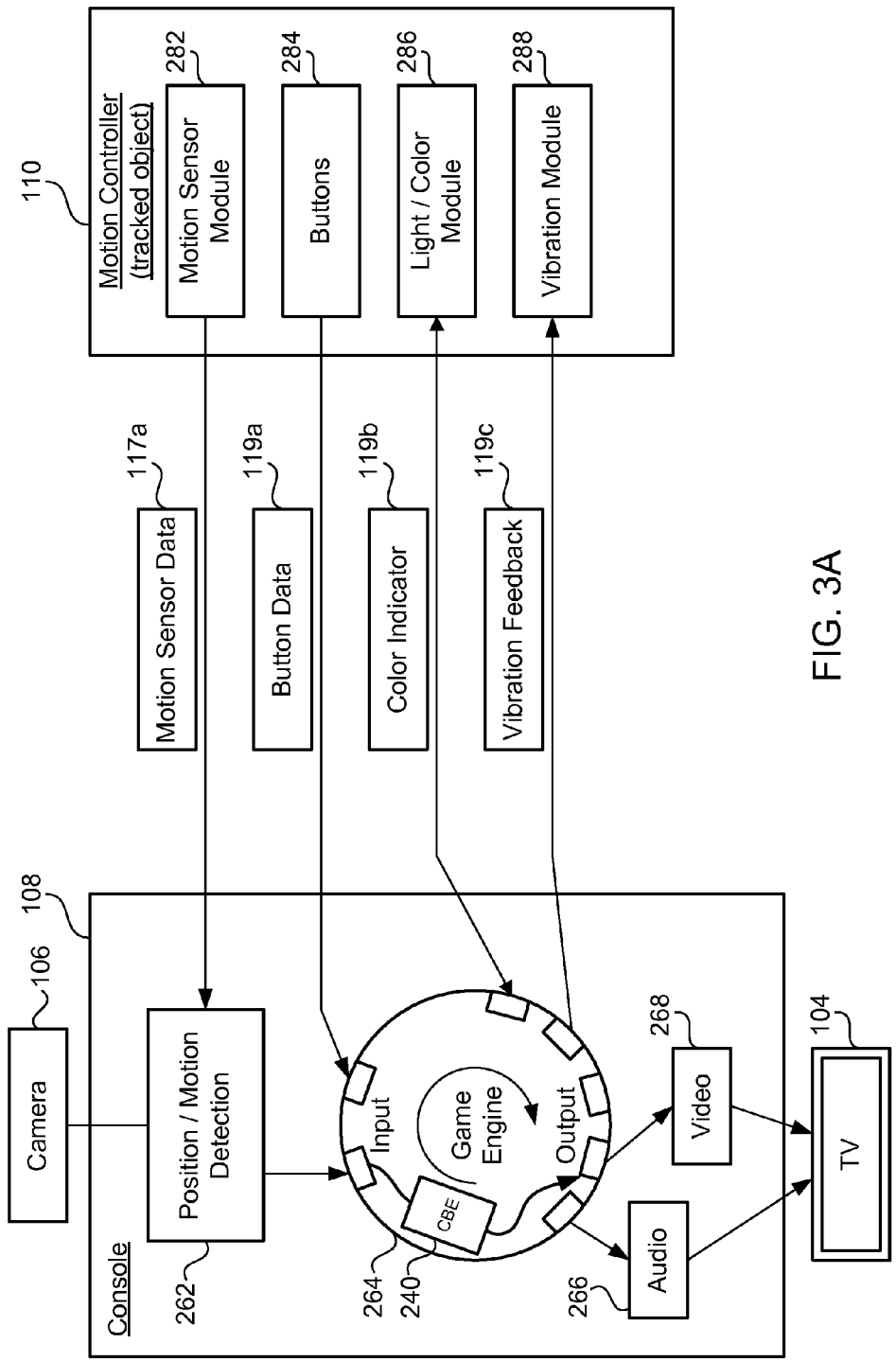
FIG. 3A illustrates the calibration and bias engine that provides multiple outputs based on multiple inputs, in accordance with one embodiment of the present invention.

FIG. 3A illustrates an embodiment of the calibration and bias engine 240 that provides multiple outputs based on multiple inputs. Motion sensing data 117a is communicated to the position/motion detection 262, as well as button data 119a, which is received from buttons 284 of the tracked object 110. Light and color module 286 can also produce or receive color indicators 119b, and vibration feedback 119c from vibration module 288, all of which communicate with a game engine 264 of computer 108, that is executing at least one interactive program or general program. The game engine 246 is associated with or is in communication with the CBE 240. The CBE 240 receives inputs from the position/motion detection 262, processes the inputs to determine entries in multiple look-up tables, and applies the entries as bias. The bias is applied by the display generator 224 (FIG. 2) to either change or avoid changing a position of a cursor, representing a position and motion of tracked object 110, displayed on display screen 104. The game engine can therefore provide outputs, which can include audio 266, bias, and video 268 that is provided to a display 104.

Figure 3B:
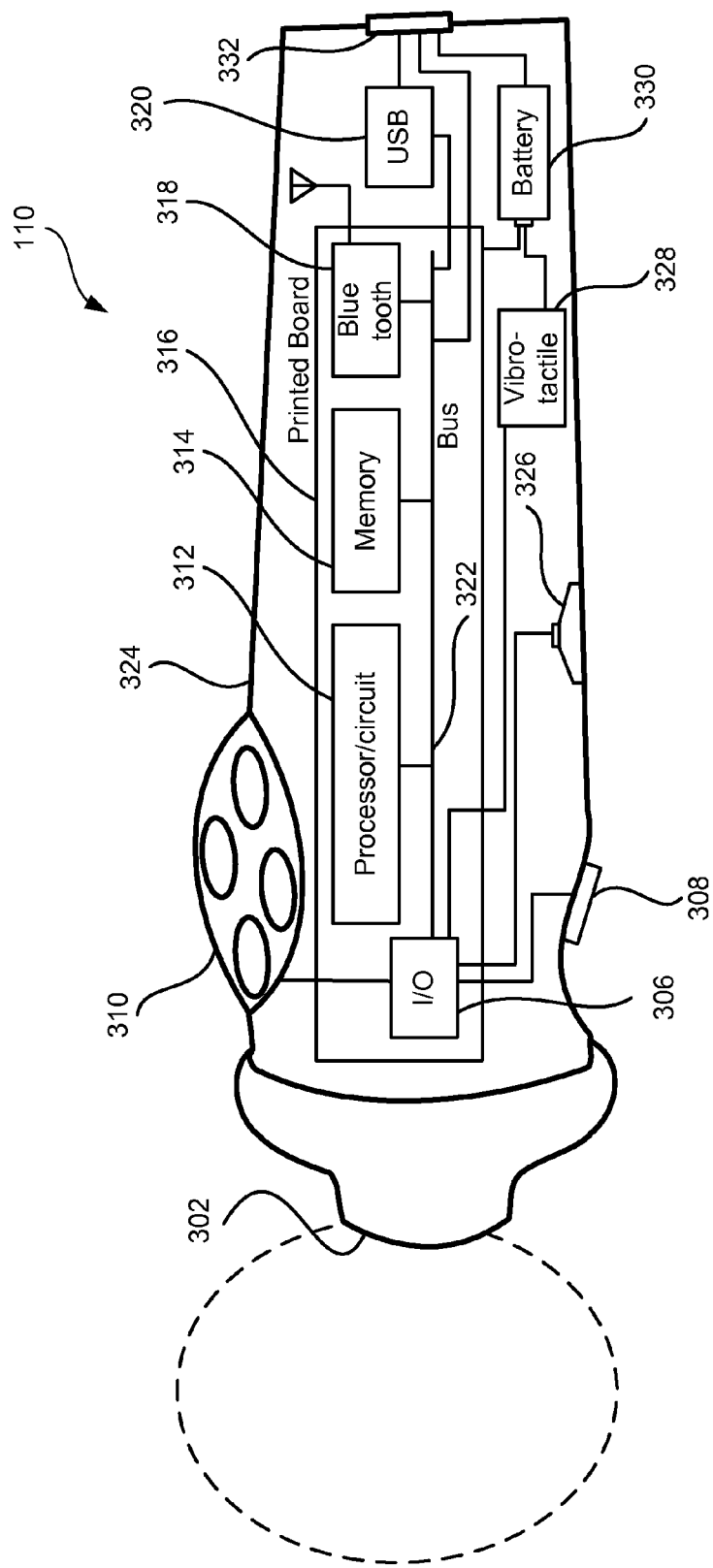
FIG. 3B illustrates the components of a single-hand controller, which is also a tracked object, with expansion connector, in accordance with one embodiment of the present invention.

FIG. 3B illustrates the components of one embodiment for a single-hand controller, which is also a tracked object 110, with expansion connector 302. Although controllers defined within the spirit and scope of the claims may have more or less components, these exemplary components show example electronics, hardware, firmware, and housing structure to define an operable example. These example components, however, should not limit the claimed inventions, as more or fewer components are possible. Handle 324 is configured to be held by a user operating controller with a single hand. A user's second hand may, of course, be used to hold or select buttons on handle 324. A user holding the controller can provide input by pressing buttons, such as top button 310 and bottom button 308. In one embodiment input can also be provided by moving the controller within a three-dimensional space when a visually recognizable attachment is coupled to handle 324. The controller is configured to operate wirelessly, which facilitates freedom of controller movement in order to interact with the base station device. Wireless communication can be achieved in multiple ways, such as via Bluetooth® wireless link, WiFi, infrared (not shown) link, etc.

Attachments providing expanded capabilities to handle 324 are connected and disconnected to expansion connector 302. In one embodiment, a spherical object or imperfect sphere enables the base computing device to locate the combination of handle 324 and attachment within a three-dimensional space via visual recognition of images taken by a camera attached to the base device. Other embodiments provide additional communication capabilities to controller, such as an attachment that provides ultrasonic communication with the base computing device or with other controllers in the field of play. In yet another embodiment, an attachment provides infrared capabilities to allow the controller to communicate via infrared frequencies with the base station, or to use a controller as a remote control for a TV or other electronic equipment.

In one embodiment, the attachment communicates directly with the base station and can act upon commands received from the base station, such as turning on an internal light or emitting a sound. In another embodiment, the attachment is directly controlled by handle 324 and the attachment only reacts to commands from handle 324. In yet another embodiment, the attachment can react to commands received from the base station or from the handle.

Inside handle 324, printed circuit board 316 holds processor 312, Input/Output (I/O) module 306, memory 316, and Bluetooth module 318, all interconnected by bus 322. A Universal Serial Bus (USB) module 320 also provides interactivity with the base computing device, or with other devices connected to USB port 332. The USB port can also be used to charge a rechargeable battery 330. Vibrotactile feedback is provided by vibrotactile module 328. Speaker 326 provides audio output.

Note that the above controller configuration is exemplary and many modifications thereto, including eliminating or adding modules, would occur to a person of ordinary skill in the art with access to the present Specification, and is well within the scope of the claimed invention. For example, controller 110 can also include sensors for mechanical tracking of the controller movement.

Figures 4A, 4B:
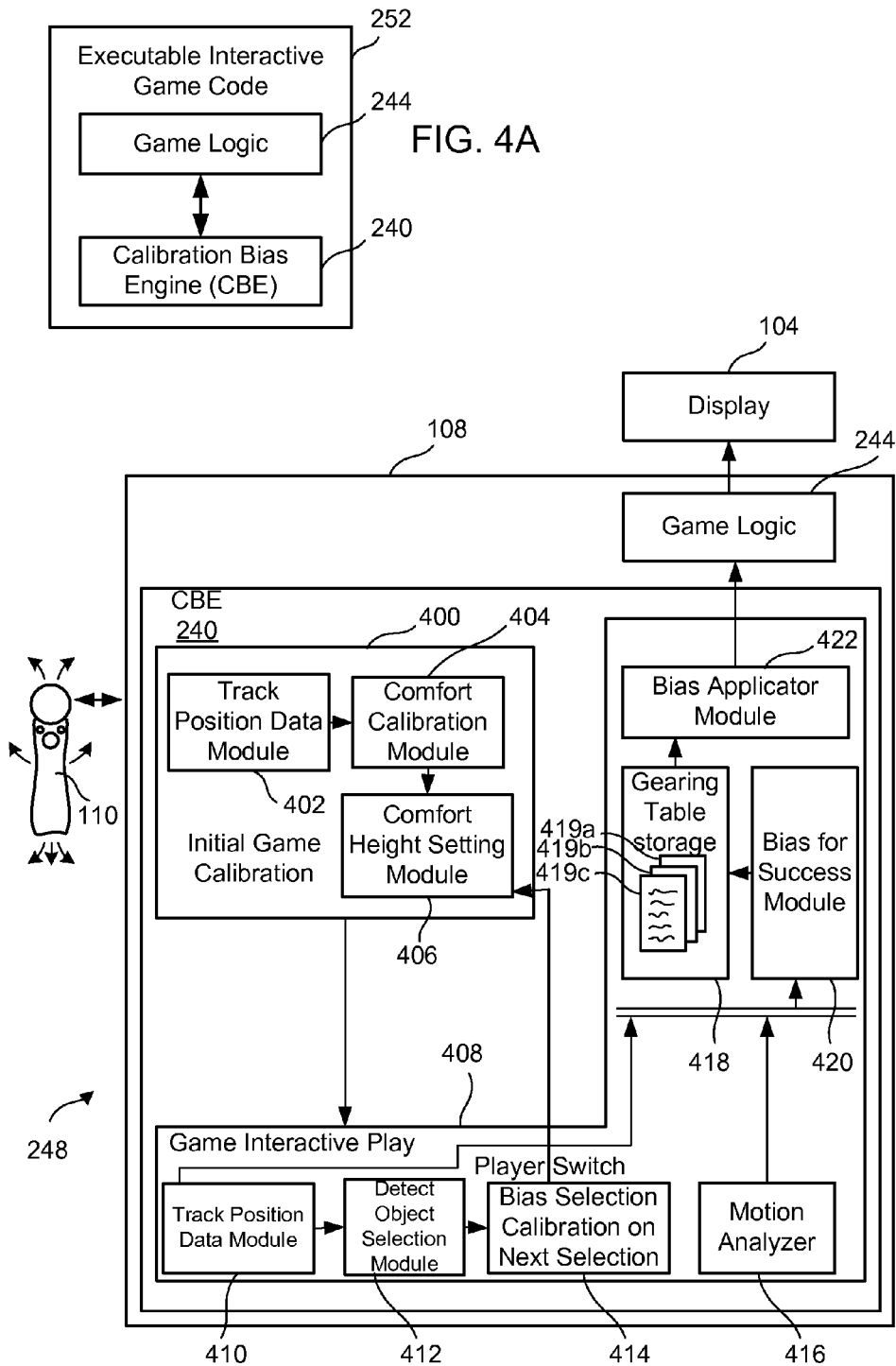
FIG. 4A is a block diagram of an executable interactive game code including the calibration and bias engine, in accordance with one embodiment of the present invention.
FIG. 4B is a schematic of a calibration and biasing system used to calibrate and/or bias a cursor, in accordance with one embodiment of the present invention.

FIG. 4A is a block diagram of an embodiment of the executable interactive game code 252. CBE 240 provides outputs to Game Logic 244. For example, CBE 240 may bias a cursor displayed on display screen 104 to help a user achieve success in a game played using the Game Logic 244. The biasing may be performed using one or more gearing tables, which the CBE 240 looks up.

FIG. 4B is a schematic of an embodiment a calibration and biasing system 248 used to calibrate and/or bias a cursor. A Track Position Data module 402 tracks the position data generated from a position of tracked object 110. A Comfort Calibration module 404 receives the position data to define ranges of movements. The ranges are provided to a Comfortable height Setting module 406 to generate a comfortable height setting. In one embodiment, the Comfortable height setting module 406 need not receive a height of the user to determine a comfortable height associated with the user. In an embodiment, the comfortable height is a parameter determined based on the range of movement identified during a calibration operation. The range of movement can be associated with a user who may be positioned in various states. For instance, the user may be in a sitting state, a standing state, a bent state, a crouching state, or is able to move between these various states during game play.

In another embodiment, the computer 108 defines a comfortable height of a user based on a distance between the tracked object 110 and a reference. For example, the image capture device 108 captures three images of a user when the user points to two corners and a center of the display 104. One of the images is captured when the user points to one corner of the display 104. Another one of the images is captured when the user points to another diagonally opposite corner of the display 104. Yet another one of the images is captured when the user points to the center of the display 104. The three images also include an image of a reference. The computer 108 determines a distance between the tracked object 110 and the reference in each image, calculates an average of the three distance values, and scales the average based on a distance between the tracked object 110 and the display 104 to determine a scaled average distance, which is the comfortable height. As another example, the image capture device 108 obtains an image of a user when the user points to a center of the display 104. The image also includes an image of a reference. The computer 108 determines a distance between the tracked object 110 and the reference in each image, scales the distance based on a distance between the tracked object 110 and the display 104 to determine a scaled distance, which is a comfortable height of the user.

It should be noted that in several embodiments, the computer 110 determines a distance between a portion, e.g., ball portion, of the tracked object 110 and the display 104 based on a size of the portion that is displayed on the display 104. For example, when the size of the portion on the display 104 is the same as that of a size of the portion as captured by the image capture device 108, the computer 110 determines that the distance between the portion and the display 104 is zero. As distance between the portion and the display 104 increases, a size of an image of the portion on the display 104 decreases.

The comfortable height setting has a comfortable height associated with a user. The comfortable height is the height position of the controller, when held by the user. For example, a user that is wearing a suit and tie may hold tracked object 110 at a higher height than a user who is wearing casual clothes, thus various "comfortable" heights can be defined, based on the user. In general, however, the comfortable height of a user may be a location near or beside where a user's belt may be located. From this comfortable height, the system can determine or approximate the height of the user. As another example, a user who lacks balance may hold the tracked object 110 at a lower height than when the same user stands balanced. This comfortable height is used, as defined below, as a basis or reference point to make bias adjustments after initial calibration is completed. The comfortable height is usually measured from a floor on which a user carrying a controller is situated. The user may be sitting, standing, or laying down with respect to the floor. In this embodiment, the floor is just one type of reference point, and it should be understood that a user can be standing on objects, such as tables, couches, or sitting on moving objects (e.g., a rolling chair). Thus, so long as a reference is established, the height can be determined based on that reference. In several embodiments, the comfortable height is a playing height of a user or a normal height of the user when the user is using a tracked object.

The Track Position Data module 402, the Comfort Calibration module 404, and the Comfortable height Setting module 406 are parts of an Initial Game Calibration 400, which is a module. The Initial Game Calibration 400 is used to determine positions of the tracked object 110 before game play, or at initialization of game play. Moreover, the initial game calibration 400 is used to determine position of the capture device 106 relative to the display 104 before game play. It should be noted that Game Logic 244 may or may not be executed during execution of the initial game calibration 400. Accordingly, the initialization occurs before active game play is executed at initial game calibration 400.

In one embodiment, Game Interactive Play 408 is executed while executing Game Logic 244. The game interactive play 408 receives the comfortable height setting and other calibration data from the Comfortable height Setting module 406. The other calibration data includes the position of the capture device 106 relative to the display 104 and errors in positions of a cursor. An error in a cursor position is a difference between an actual position of an object image on display 104 and a position of a cursor.

During the interactive game play 408, a Track Position Data module 410 tracks the position data received from the tracked object 110. During game play, a user selects an image, of an object, that is displayed on display 104 to generate a cursor in display 104. The user may select an image by selecting a button on tracked object 110. When a user selects the image, the Detect Object Selection module 412 generates a cursor indicating the position of the tracked object 110 with respect to the image of the object. As an example, the cursor may be generated when a user selects any button on the single-hand controller to pick up or grab a ball image displayed on display 104.

A Bias Selection module 414 determines an error in a position of a cursor and the image of the object. The error is provided to the Comfortable height Setting module 406 to adjust or confirm the comfortable height of a user that has been generated by the Comfort Calibration module 404. The comfortable height is provided by the Comfortable height Setting module 406 to Game Logic 244.

Moreover, in some embodiments, in case of a switch in users during game play, the Detect Object Selection module 412 detects a selection of an image, of an object, on display 104 to generate another cursor. A switch in users occurs when the tracked object 110 is handed from one user to another. The Bias Selection module 414 determines an error based on a position of the cursor generated after the user switch and a position of the image of the object. The error is provided to the comfortable height setting to set a comfortable height of the new user. Such a change in the comfortable height facilitates dynamic update of comfortable height during game play in case of a change in users during game play. Again, the comfortable height after the switch is provided by the Comfortable height Setting module 406 to Game Logic 244.

Bias selection module 414 removes the error when a user selects another image of an object. For example, if the user selects a button of the single-hand controller to select a ping pong racket image and there is a difference in a position of a cursor and the image, the Bias Selection module 414 removes the error. The removal of the error may facilitate performance of an action that a user intends to perform in a game. For example, if the user wishes to pick up a ping pong racket image displayed on display 104, the removal of the error results in the pick up. Otherwise, the nonremoval may result in a non pick up of the ping pong racked image even though a user selects a button of the single handed controller and points the controller at the display 104 in a direction of the ping pong racket image.

A motion analyzer 416 analyzes a motion of the tracked object 110. The position and motion of the tracked object 110 are provided to a Bias For Success module 420 to generate and provide inputs to gearing tables 419. The gearing tables are stored in a Gearing Table storage 418, which may be a database. Although many more tables may be constructed as part of the Gearing Table storage 418, in one embodiment, a side-step gearing table 419a, a depth-to-strength gearing table 419b, and/or an underarm/overarm gearing table 419c can be stored in the Gearing Table storage 418. In one embodiment, during development of a game, the gearing tables can be adjusted to provide various outputs, given the desired game actions. As such, the gearing tables are flexible in construction and programming, such that modifications can be made manually during development of game code or can be done by way of a computer program. The computer program can also include a plurality of graphical user interface tools, which allow for fine tuning of any number of multi-variable or related data values. If done by a computer program, the computer program can provide visual outputs to the developer to allow for easy visualization of the performance adjustments and weighting provide by individual changes or additions to the gearing tables. Thus, the gearing tables can be fine-tuned until the desired output response on a screen is rendered based on the captured motion gesture provide by the motion controller.

A Bias For Success module 420 receives the position data from Track Position Data module 410 and motion data from the motion analyzer 416 to determine a bias input to provide to gearing tables 419. Based on the gearing data contained in the Gearing Table storage 418, the output bias may be adjusted dynamically for application by the Bias Applicator module 422, which will in turn illustrate the applied bias on the performance of the cursor or object (e.g., as controlled by the motion controller). Again, the applied bias may be applied to any graphical object, control of a graphical object, an avatar, an object to be grabbed, held, controlled, tossed, or manipulated in any way, by way of commands provided by the user through motions and positions of the motion controller.

In one embodiment, the bias For Success module 420 may include processing logic to generate a side-stepping bias, a depth-to-strength bias, or to determine whether an underarm or an overarm motion occurred. In case a bias is not generated by Bias For Success module 420, the Bias For Success module 420 avoids sending the bias to the gearing tables 419. Bias Applicator module 422 applies the bias as may be adjusted by data (e.g., weighting data) contained in the gearing tables 419. Bias Applicator module 422 that applies the bias. The bias is applied by Bias Applicator module 422 to allow a user to achieve success during game play. For example, the bias is applied so that all bowling pin images are knocked down instead of a few bowling pins. As another example, the bias is applied so that a ping pong ball image lands on a table image instead of off a table. The applied bias is provided to Game Logic 244 that incorporates the applied bias into a game, which is displayed on display 104.

In case Bias For Success module 420 avoids sending a bias to the Gearing Tables 419, Bias For Success module 420 forwards the position data received from Track Position Data module 410 and motion data received from Motion Analyzer 416 to Bias Application module 422. The Bias Applicator module 422 further sends the position and motion data to Game Logic 244. Game Logic is executed to display a cursor on display 104 based on the position and motion data.

It should be noted that in other embodiments, the computer 108 may avoid adjusting or confirming the comfortable height. In such embodiments, the computer 108 avoids executing the Detect Object Selection module 412 and performs bias selection based on the comfortable height setting generated by the Comfortable height Setting module 406. In such embodiments, the comfortable height is generated based on the ranges of movements.

Figure 5:
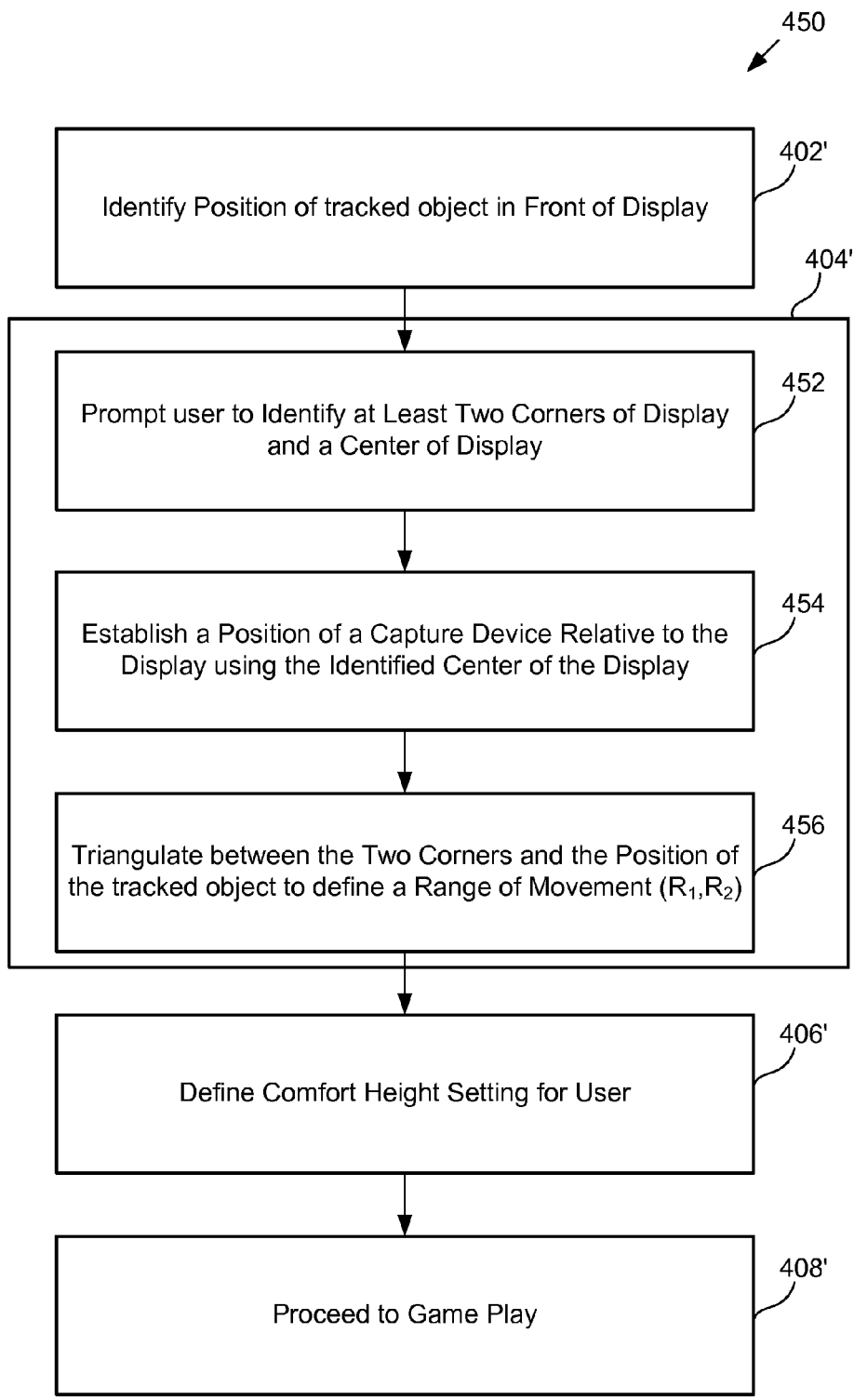
FIG. 5 is a flowchart of a method for determining a comfortable height of a user, in accordance with one embodiment of the present invention.

FIG. 5 is a flowchart 450 of an embodiment of a method for determining a comfortable height of a user. The method is executed by one or more processors of the computer 108. In operation 402', a position of the tracked object 110 in front of display 104 is identified using the capture device 106 or electronics within the tracked object 110. In a following sub-operation 452 of an operation 404', a user is prompted to identify two or more corners of display 104 and a center of display 104. For example, the user is prompted to point the tracked object 110 towards the center of display 104 first, then towards a top left corner of the display 104, and lastly towards a bottom right corner of display 104. It should be noted that the top left corner of the display 104 is diagonally opposite to the bottom right corner of the display 104.

Moreover, in a sub-operation 454 of the operation 404', the computer 108 establishes a position of the image capture device 106 with respect to the display 104 using the identified center of the display 104. For example, the camera is on top of the display 104 if the identified center is below a co-ordinate of the camera. As another example, the camera is to the right of display 104 if the identified center is to the left of a co-ordinate of the camera. In a sub-operation 456 of the operation 404', the computer 108 triangulates between the two corners and the position of the tracked object 110 to determine a range, such as $R_1$ or $R_2$, of movement of the tracked object 110. It should be noted that in several embodiments, a range of movement for a user is based on a set position of the display 104, a location of the user relative to the display 104, a state of the user, and a stature of the user. Examples of a state of a user include whether the user is standing, sitting, or laying down. Examples of a stature of a user include whether the user is tall, short, or of average height.

In several embodiments, the computer 108 triangulates between the two corners and the position of the tracked object 110 to determine a size of the display 104. For example, the computer 108 determines a first distance between the tracked object 110 and a first location on the display 104 at which the tracked object 110 is pointed and a second distance between the tracked object 110 and a second location on the display 104 at which the tracked object 110 is pointed, and determines a distance between the first and second locations. The distance between the two locations is equal to a size of the display 104. The first location is determined when the user points towards a first corner of the display 104 and the second location is determined when the user points towards a second corner of the display 104. As another example, the computer 108 applies an offset to the first location to correct for any bias and applies an offset to the second location to correct for any bias, and determines a distance between the two offset corrected locations to determine a size of the display 104. The size of the display 104 may be used by the game logic 244 to apply to a display of a game on the display 104.

In operation 406', a comfortable height setting for a user is defined based on the range. For example, a comfortable height $ch_1$ is determined upon determining that a user has a range $R_1$ and a comfortable height $ch_2$ is determined upon determining that a user has a range $R_2$. The comfortable height setting of a user is used during game play once the computer 108 allows the user, in operation 408', to proceed to game play. It should be noted that the operation 402' is part of the track position data module 402, the operation 404' is part of the comfort calibration module 404, the operation 406' is part of the Comfortable height Setting module 406, and the operation 408' is part of the game interactive play 408, which is a module. It should be noted that in one embodiment, a module, as used herein may be a piece of software code.

Figure 6A:
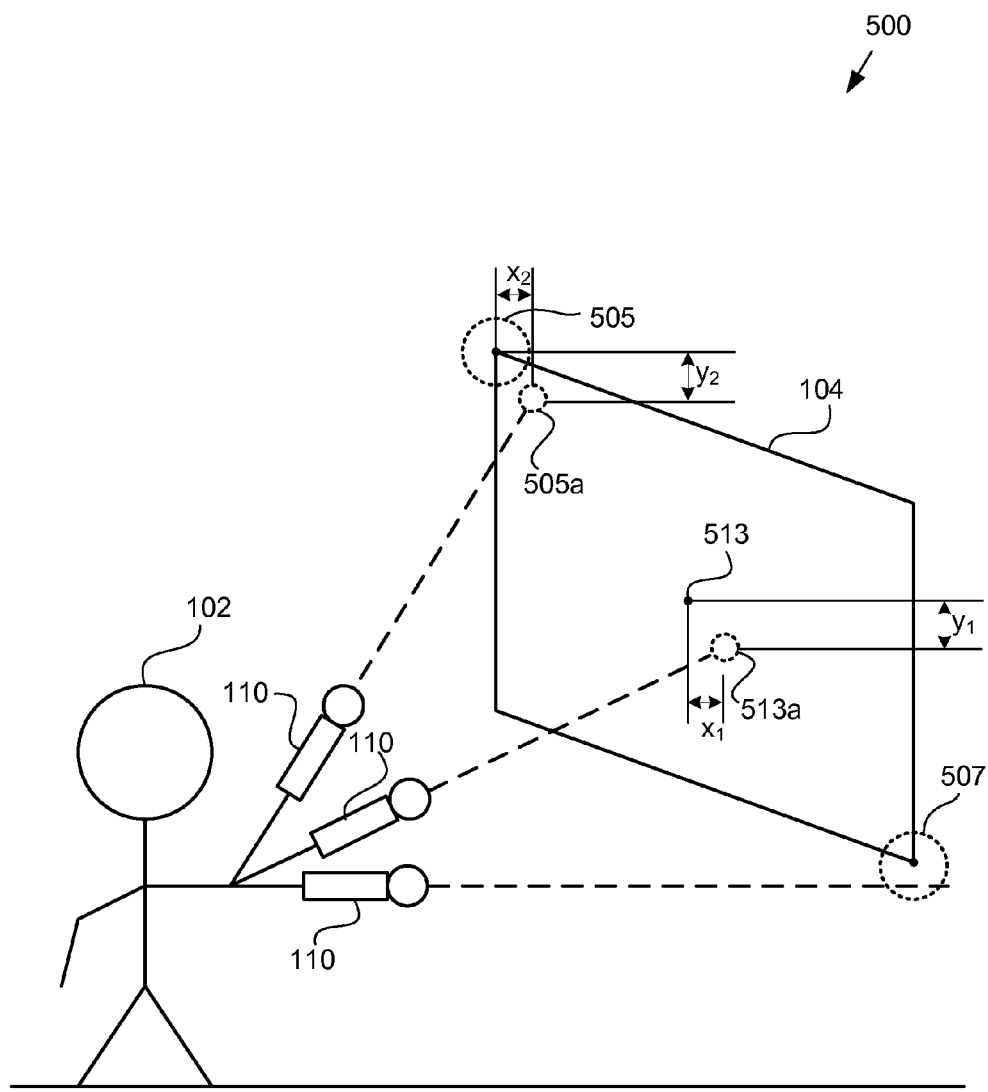
FIG. 6A illustrates a calibration environment in which the user is prompted to point towards a center of a display screen and then towards to corners of the display screen, in accordance with one embodiment of the present invention.

FIG. 6A illustrates a calibration environment 500 in which the user 102 is prompted to point towards a center 513 of display screen 104 and then towards to corners 505 and 507 of the display screen 507. When the Comfort Calibration module 404 prompts the user 102 to point tracked object 110 towards center 513, the user 102 may point at an offset from the center 513 and select a button on the tracked object 110 to generate a cursor 513a. The Comfort Calibration module 404 measures an error $(x_1, y_1)$ between cursor 513a and the center 513. The error has a distance $x_1$ in an x-direction from the center point 513 and a distance $y_1$ in a y-direction from the center point 513.

The Comfort Calibration module 404 further prompts the user 102 to point the tracked object 110 towards the top left corner 505 of display 104. The user 102 may point at an offset from top left corner 505 and select a button on the tracked object 110 to generate a cursor 505a. The Comfort Calibration module 404 measures an error $(x_2, y_2)$ between cursor 505a and the top left corner 505. The error has a distance $x_2$ in the x-direction from the top left corner 505 and a distance y2 in the y-direction from the top left corner 505.

Similarly, the Comfort Calibration module 404 further prompts the user 102 to point the tracked object 110 towards the bottom right corner 507 of display 104 to determine an error an error $(x_3, y_3)$ between a cursor and the bottom right corner 507. In other embodiments, the Comfort Calibration module 404 prompts the user to point to center point 513 first, then to bottom right corner 507, and then to top left corner 505.

Also, the Comfort Calibration module 404 determines whether a position of cursor 513a is to the left, right, bottom, or top of the image capture device 106 to determine whether the image capture device 106 is to the right, left, top, or bottom of the display 104. The determination that the image capture device 106 is to the right, left, top, or bottom of the display 104 is provided to the game logic 244. The game logic 244 determines that the user 102 is at the same position with respect to the image capture device 106 as that of the location of the display 104 with respect to the image capture device 106. For example, the game logic 244 determines that the user 102 is to the right of the image capture device 105 when the display 104 is to the right of the image capture device 106.

Upon considering the relative position between the user 102 and the image capture device 106, the game logic 244 modifies a location of a cursor on the display 104 to display the modified location on the display 104. For example, upon determining that the user 102 is to the right of the image capture device 106 as viewed from a standpoint of the image capture device 106, the game logic 244 modifies the location of a cursor on the display 104 to move to the right as viewed from a standpoint of the user 102. In one embodiment, an amount of movement of the cursor location is proportional to, e.g., same as that of, a fraction of, etc., a distance to the right of the image capture device 106 towards the user 102. In this example, the image capture device 106 is located on a right edge of the display 104 as viewed from a standpoint of the user 102. Moreover, in this example, the image capture device 106 is a square or rectangular device that has four edges, e.g., right, left, top, and bottom. As another example, upon determining that the user 102 is to the left of the image capture device 106 as viewed from a standpoint of the image capture device 106, the game logic 244 modifies the location of a cursor on the display 104 to move to the left as viewed from a standpoint of the user 102. In this example, the image capture device 106 is located on a left edge of the display 104 as viewed from a standpoint of the user 102. In one embodiment, an amount of movement of the cursor location is proportional to a distance to the left of the image capture device 106 towards the user 102.

The errors $(x_1, y_1)$, $(x_2, y_2)$, and $(x_3, y_3)$ are provided to Bias Selection module 414. For example, a normalization, such as a mean or a median of the errors is provided to Bias Selection module 414 by the Comfort Calibration module 404. The Bias Selection module 414 removes the normalization to generate a cursor indicating a position of the tracked object 110 when user 102 selects an image on display 104.

Figure 6B:
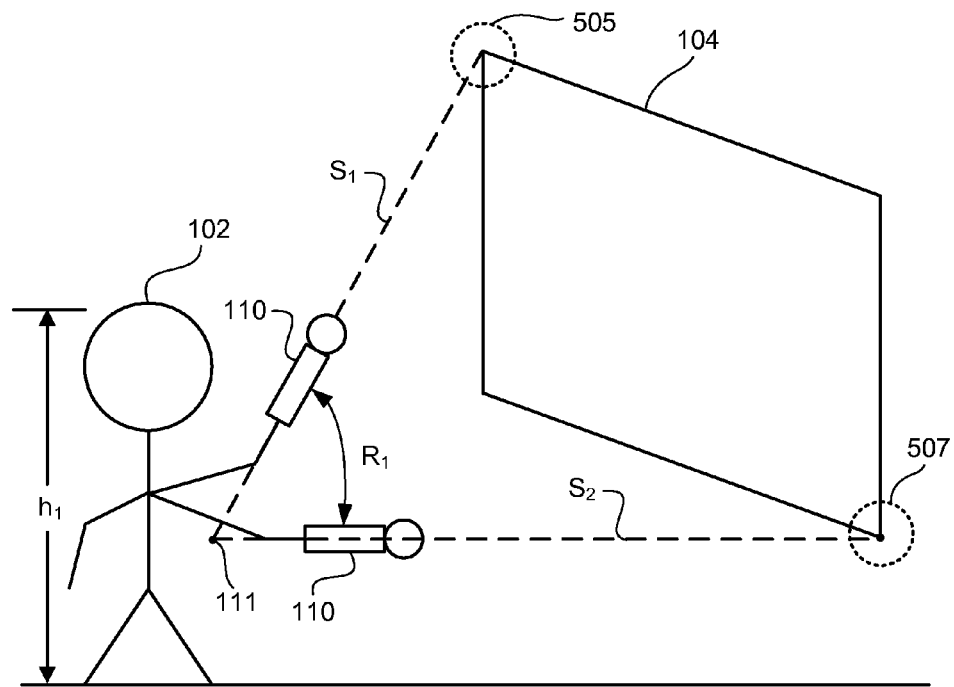
FIG. 6B illustrates a calibration environment used to generate a triangulation between the corners and the tracked object when a height of a user is being calibrated, in accordance with one embodiment of the present invention.

FIG. 6B illustrates a calibration environment 503 used to generate a triangulation between corners 505 and 507 of display 104 and tracked object 110 when a comfortable height of a user 102 is being calibrated. Comfort Calibration module 404 prompts the user 102 to point to top left corner 505 and then at bottom right corner 507. When the user 102 points first to the top left corner 505 and then to the bottom right corner 507, the range $R_1$ of motion of tracked object 110 develops. The range $R_1$ is an angle formed between two sides $s_1$ and $s_2$ of a triangle. The triangle has the top left corner 505 and bottom right corner 507 as two vertices. A third vertex is formed by an intersection, e.g., a point 111. The intersection is formed by extrapolating a line, e.g., the side $s_1$, formed between the top left corner 505 and tracked object 110 and another line, e.g., the side $s_2$, formed between the bottom right corner 507 and the tracked object 110.

Figure 6C:
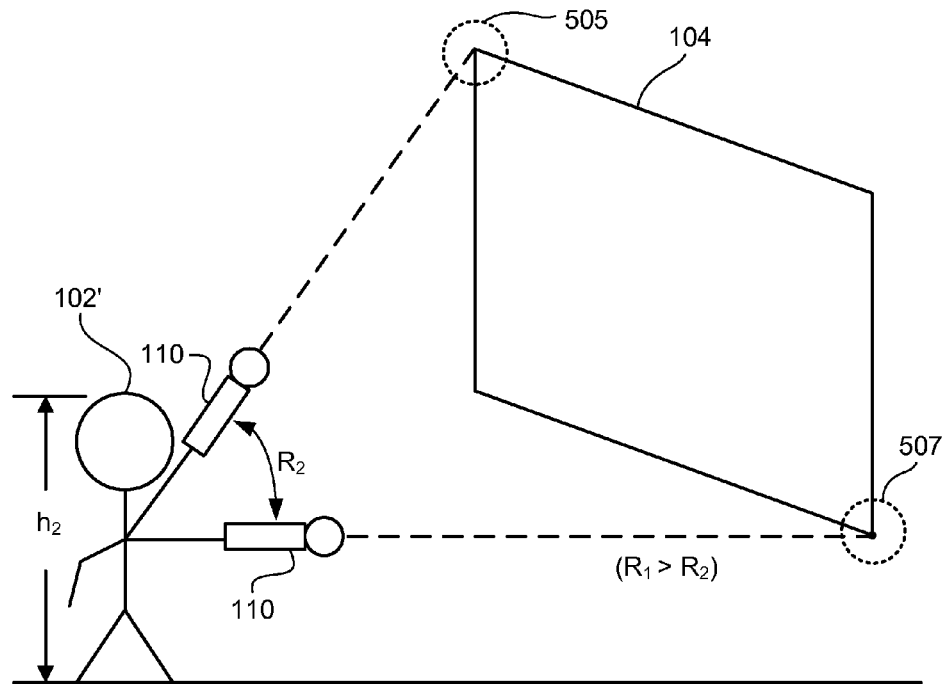
FIG. 6C illustrates a calibration environment used to generate a triangulation between the corners of and tracked object when a height of another user is being calibrated, in accordance with one embodiment of the present invention.

FIG. 6C illustrates a calibration environment 509 used to generate a triangulation between corners 505 and 507 of display 104 and tracked object 110 when a comfortable height of a user 102' is being calibrated. When user 102' is prompted to point from top left corner 505 to bottom right corner 507, the user 102' performs a motion to generate a range $R_2$. The Comfort Calibration module 404 provides the ranges $R_1$ and $R_2$ to Comfortable height Setting module 406.

Upon receiving the ranges, Comfortable height Setting module 406 determines that the range $R_1$ is greater than the range $R_2$ to further determine that the comfortable height $ch_1$ is greater than a comfortable height $ch_2$ of the user 102'.

Figure 7A:
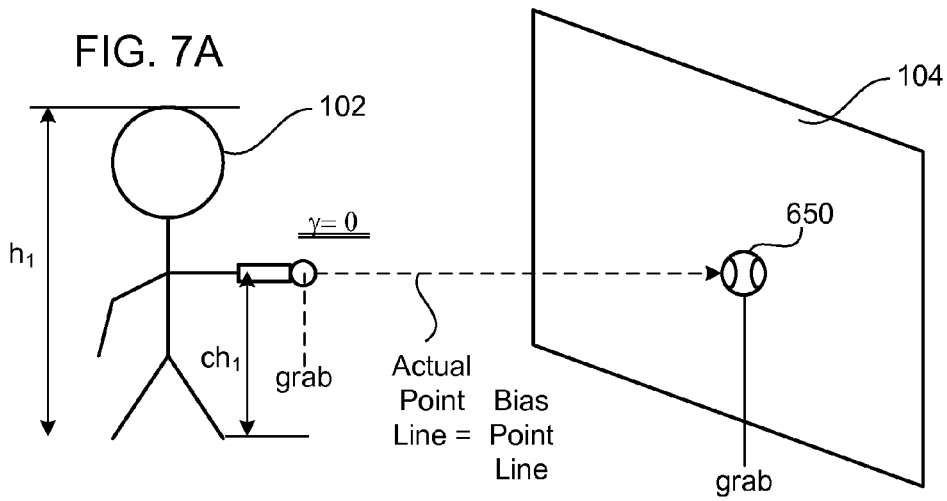
FIG. 7A is an isometric view of a game environment used to illustrate a nonapplication of bias based on a comfortable height of a user, in accordance with one embodiment of the present invention.

FIG. 7A is an isometric view of an embodiment of a game environment used to illustrate a nonapplication of bias based on comfortable height of user 102. In this case, there was a lack of existence of an error between a position of an object image displayed on display 104 and a cursor generated by selection of a button by the user 102. In such a case, Bias Selection module 414 avoids selecting a bias for the user 102 in providing the comfortable height $ch_1$ of the user 102 to game logic 102. Display 104 uses game logic 102 to generate an image of a baseball 650 on display 104 lacking application of a bias.

Figure 7B:
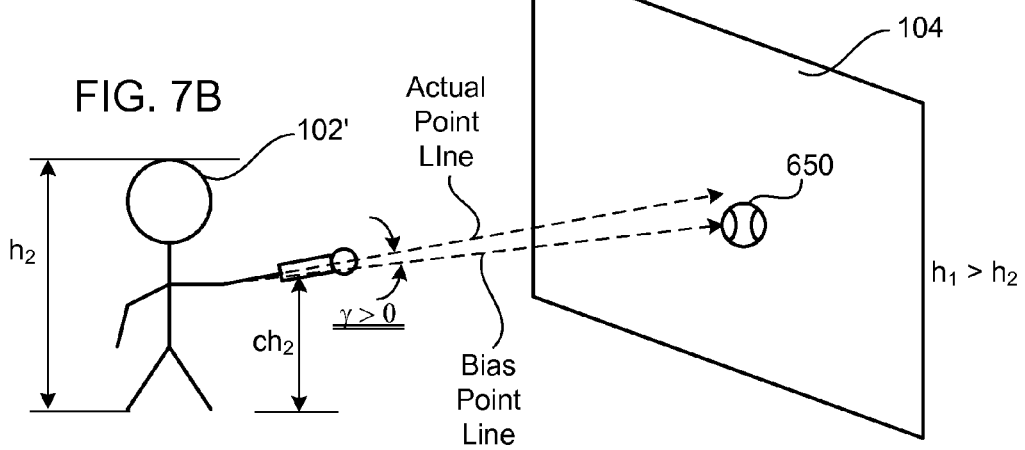
FIG. 7B is an isometric view of a game environment used to illustrate application of bias based on a comfortable height of another user, in accordance with one embodiment of the present invention.

FIG. 7B is an isometric view of an embodiment of a game environment used to illustrate application of bias based on comfortable height $ch_2$ of user 102'. Bias Selection module 414 removes an error of an angle γ, which in this case is greater than zero, between an actual point line and a bias point line to provide a comfortable height setting to Comfortable height Setting module 406. The actual point line extends from tracked object 110 towards display 104 when the user 102' is at an uncomfortable height. The bias point line extends from tracked object 110 towards display 104 when the user 102' is at a comfortable height. The comfortable height of the user 102' is provided by Comfortable height Setting module 406 to game logic 102. Display 104 uses game logic 102 to generate an image of a baseball 650 at the comfortable height rather than at the uncomfortable height.

Figure 7C:
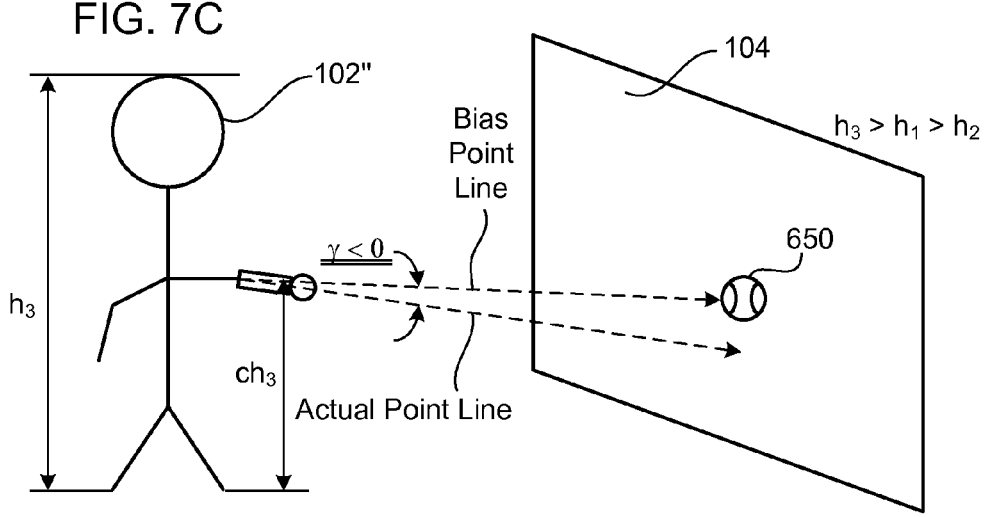
FIG. 7C is an isometric view of a game environment used to illustrate application of bias based on comfortable height of yet another user, in accordance with one embodiment of the present invention.

FIG. 7C is an isometric view of an embodiment of a game environment used to illustrate application of bias based on comfortable height $ch_3$ of a user 102". The comfortable height $ch_3$ is greater than $ch_1$, which is greater than $ch_2$. Bias Selection module 414 removes an error of an angle γ, which in this case is less than zero, between an actual point line and a bias point line to provide a comfortable height setting to Comfortable height Setting module 406. The actual point line extends from tracked object 110 towards display 104 when the user 102" is at an uncomfortable height. The bias point line extends from tracked object 110 towards display 104 when the user 102" is at a comfortable height. The comfortable height of the user 102" is provided by Comfortable height Setting module 406 to game logic 102. Display 104 uses game logic 102 to generate an image of a baseball 650 at the comfortable height rather than at the uncomfortable height.

It is noted that in one embodiment, a comfortable height correlates to a height of a user. For example, the comfortable height $ch_1$ correlates to a height $h_1$ of the user 102, the comfortable height $ch_1$ correlates a height $h_2$ of the user 102', and the comfortable height $ch_3$ correlates to a height $h_3$ of the user 102". As another example, the taller a user, the greater is the user's comfortable height. User 102 is taller than user 102' and the comfortable height $ch_1$ height is greater than the comfortable height $ch_2$. The height h of the user is thus an approximation based on the comfortable height.

Figure 8A:
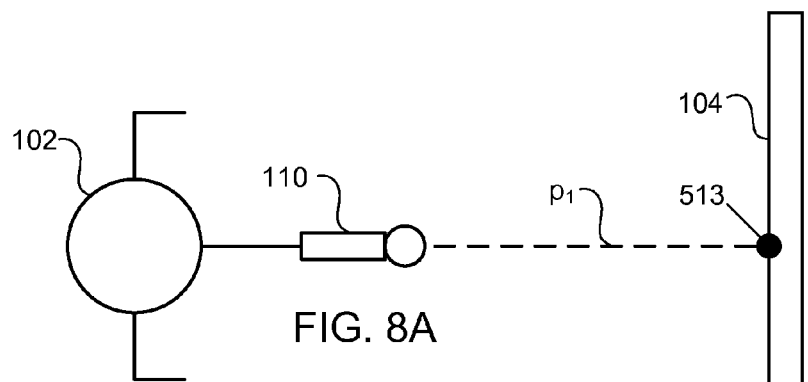
FIG. 8A is a top view of a game environment used to illustrate an application of bias based on side-stepping, in accordance with one embodiment of the present invention.
Figure 8B:
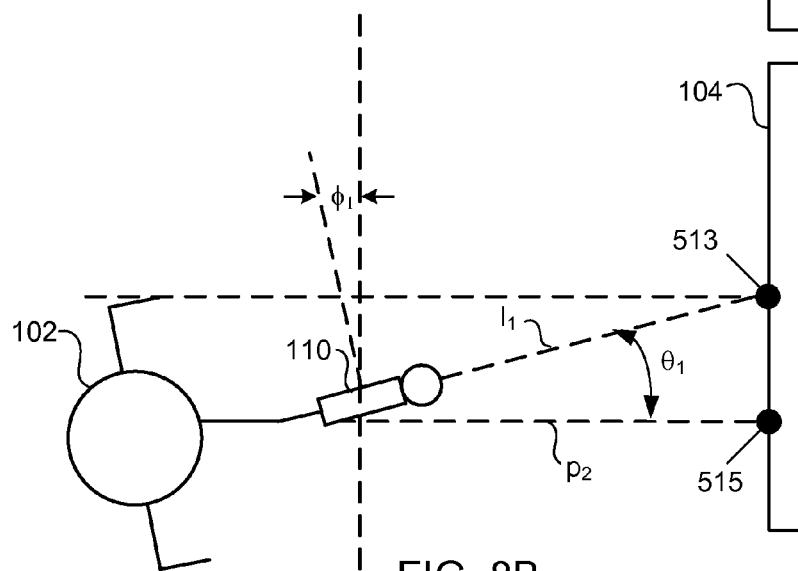
FIG. 8B a top view of a game environment used to illustrate an application of bias when a user side steps to the right of a position shown in FIG. 8A, in accordance with one embodiment of the present invention.
Figure 8C:
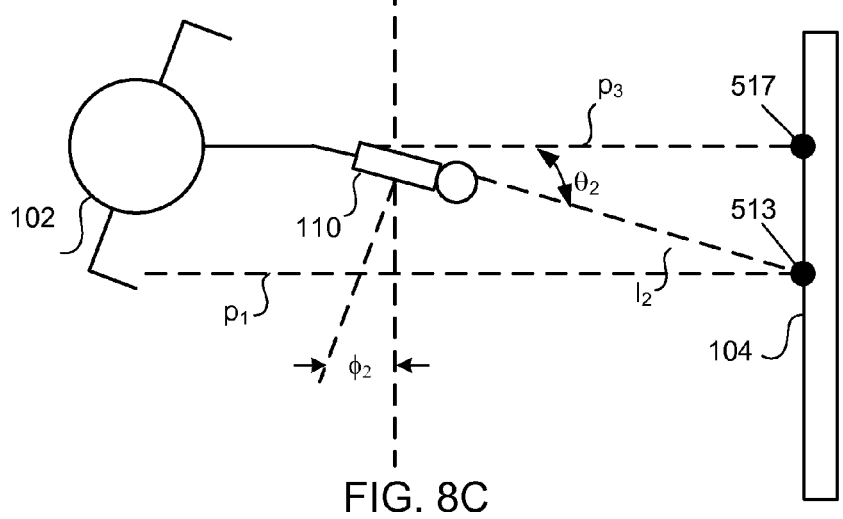
FIG. 8C a top view of a game environment used to illustrate an application of bias when a user side steps to the left of a position shown in FIG. 8A, in accordance with one embodiment of the present invention.

FIGS. 8A-8C are top views of embodiments of a game environment used to illustrate an application of bias based on side-stepping. As shown in FIG. 8A, the tracked object 110 is at a center position $p_1$ passing through center 513. The user 102 is pointing tracked object 110 towards center 513.

As shown in FIG. 8B, the user 102 side steps to the right of the center position $p_1$ during game interactive play 408. The user 102 may side step to the right to point to an object image at a point 515 on display 104 to the right of center position $p_1$. When the user 102 side steps to the right, it may be natural for the user 102 to point tracked object 110 towards center 513 instead of towards point 515. When the user 102 side steps to the right, the tracked object 110 is at position $p_2$ and forms an angle $\phi_1$ with respect to a position of tracked object 110 at position $p_1$. Bias For Success module 420 (FIG. 4B) determines an angle $\theta_1$ between position $p_2$ and a line $l_1$. The line $l_1$ is formed between center 513 and tracked object 110 that points towards center 513 after the user 102 side-steps to the right. The Gearing Table storage 418 may adjust the angle $\theta_1$, which is a function of the position $p_2$ and/or the angle $\phi_1$.

As further shown in FIG. 8C, the user 102 side steps to the left of center position $p_1$. The user 102 may side step to the left to point to an object image at a point 517 on display 104 to the left of center position $p_1$. When the user 102 side steps to the left, it may be natural for the user 102 to point tracked object 110 towards center 513 instead of towards point 517. When the user 102 side-steps to the left, the tracked object 110 is at position $p_3$ and forms an angle $\phi_2$ with respect to a position of the tracked object 110 at position $p_1$. Bias For Success module 420 determines an angle θ2 between position $p_3$ and a line $l_2$. The line $l_2$ is formed between center 513 and tracked object 110 pointing towards center 513 after the user side-steps to the left. The Gearing Table storage 418 may apply weights to the angles $\theta_1$, which is a function of the position $p_3$ and/or the angle $\phi_2$.

Bias For Success module 420 (FIG. 4B) determines whether tracked object 110 forms the angle $\phi_1$ or the angle $\phi_2$. Upon determining that the tracked object 110 forms the angle $\theta_1$, the Bias For Success module 420 generates and sends the angle $\theta_1$ via the side-step gearing table 419a to provide to Bias Applicator module 422. On the other hand, upon determining that the tracked object 110 forms the angle $\phi_2$, the Bias For Success module 420 generates and sends the angle $\theta_2$ via side-step gearing table 419a to provide to Bias Applicator module 422. Moreover, upon determining that the tracked object 110 does not form the angles $\phi_1$ or the angle $\phi_2$, the Bias For Success module 420 avoids generating and sending the angles $\theta_1$ and $\theta_2$ to the side-step gearing table 419a. The tracked object 110 does not form the angles $\phi_1$ and $\phi_2$ when the tracked object 110 is at the position $p_1$.

When the user 102 side-steps to the right during game play, Bias Applicator module 422 applies the angle $\theta_1$ to the line $l_1$ to apply bias to change a cursor from pointing towards center 513 to point towards point 515. Comparatively, when the user 102 side-steps to the right during game play, Bias Applicator module 422 applies the angle $\theta_2$ to the line $l_2$ to apply bias to change a cursor from pointing towards center 513 to point towards point 517. If an angle $\theta_1$ or $\theta_2$ is not received, the Bias Applicator module 422 avoids applying the angle $\theta_1$ or $\theta_2$ during game play to avoid applying a bias.

Bias Applicator module 422 controls Game Logic 244 to display on display 104 a cursor at point 515 instead of at center point 513 when the user 103 side-steps to the right. Moreover, Bias Applicator module 422 controls Game Logic 244 to display on display 104 a cursor at point 517 instead of at center point 513 when the user 103 side-steps to the left.

FIGS. 9A-9C are isometric views of embodiments of a gaming environment to illustrate an application of bias based on a relation between depth and strength. In FIG. 9A, the tracked object 110 is at a location $l_1$. When the user 102 hits a ping pong ball image 622 by using the tracked object 110, the ping pong ball image 622 lands at a position $pp_1$ on table image 624.

As shown in FIG. 9B, when the user 102 moves forward to displace the tracked object 110 to a location $l_2$ a distance $d_1$ from the location $l_1$, a strength applied by the user 102 to the ping pong ball image 622 may increase from strength applied by the user 102 to ping pong ball image 622 with the tracked object 110 at location $l_1$. Without application of a bias, the increase in the application of strength results in the ping pong ball image 622 to be displayed at a position $pp_2$ rather than at position $pp_1$. The position $pp_2$ is displaced a depth $dp_1$ from the position $pp_1$. The Bias For Success module 420 maps the displacement $d_1$ to the depth $dp_1$ to send the depth $dp_1$ via depth-to-strength gearing table 419b to the Bias Applicator module 422.

As further shown in FIG. 9C, when the user 102 moves back to displace the tracked object 110 to a location $l_3$ a distance $d_2$ from the location $l_1$, a strength applied by the user 102 to the ping pong ball image 622 may decrease from strength applied by the user 102 to ping pong ball image 622 with the tracked object 110 at location $l_1$. Without application of a bias, the decrease in the application of strength results in the ping pong ball image 622 to be displayed at a position $pp_3$ rather than at position $pp_1$. The position $pp_3$ is displaced a depth $dp_2$ from the position $pp_1$. The Bias For Success module 420 maps the displacement $d_2$ to the depth $dp_2$ to send the depth $dp_2$ via depth-to-strength gearing table 419b to Bias Applicator module 422.

Bias For Success module 420 (FIG. 4B) determines whether tracked object 110 is displaced by the distance $d_1$ or $d_2$. Upon determining that the tracked object 110 is displaced by the distance $d_1$, the Bias For Success module 420 generates and sends the depth $dp_1$ via the depth-to-strength gearing table 419b to provide to the Bias Applicator module 422. Comparatively, upon determining that the tracked object 110 is displaced by the distance $d_2$, the Bias For Success module 420 generates and sends the depth $dp_2$ via depth-to-strength gearing table 419b to provide to the Bias Applicator module 422. Moreover, upon determining that the tracked object 110 is not displaced from the location $l_1$, the Bias For Success module 420 avoids generating and sending the depth $dp_1$ or $dp_2$.

If Bias Applicator module 422 receives the depth $dp_1$ from the Bias For Success module 420, the Bias Applicator module 422 applies the depth $dp_1$ to the ping pong ball image 622 at location $pp_2$. Also, if Bias Applicator module 422 receives the depth $dp_2$ from the Bias For Success module 420, the Bias Applicator module 422 applies the depth $dp_2$ to the ping pong ball image 622 at location $pp_3$. If a depth is not received from the Bias For Success module 420, the Bias Applicator module 422 avoids applying the depth $dp_1$ or $dp_2$.

When the user 103 steps forward, Bias Applicator module 422 provides the depth $dp_1$ to Game Logic 244 to display on display 104 ping pong ball image 622 at the position $pp_1$ instead of at the position $pp_2$. Moreover, when the user 103 steps back, Bias Applicator module 422 provides the depth $dp_2$ to Game Logic 244 to display on display 104 ping pong ball image 622 at the position $pp_1$ instead of at the position $pp_3$. Also, Bias Applicator module 422 avoids providing the depth $dp_1$ or $dp_2$ to game logic 214 when the controller 110 is at the location $l_1$. Without the application of the depth $dp_1$ or $dp_2$ to game logic 214, the ping pong ball image 622 is displayed at the position $pp_1$.

Figure 10A:
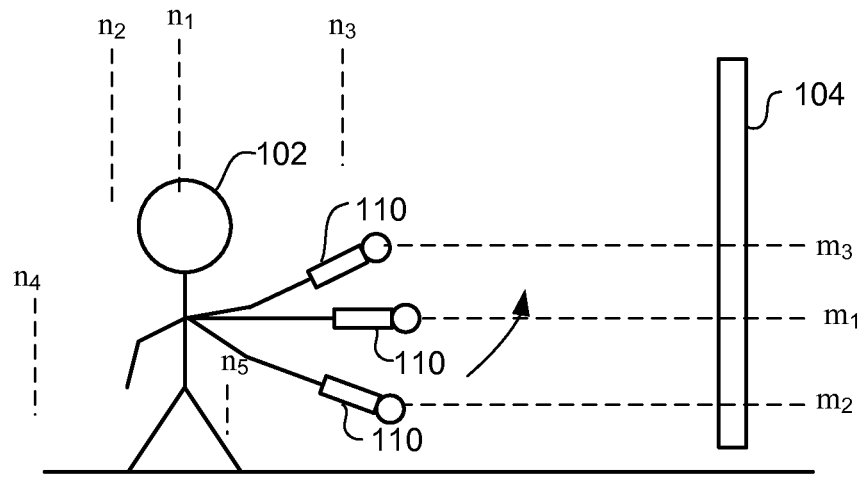
FIG. 10A is a side view of a gaming environment used to determine whether a user performs an underarm motion to throw an object image, in accordance with one embodiment of the present invention.
Figure 10B:
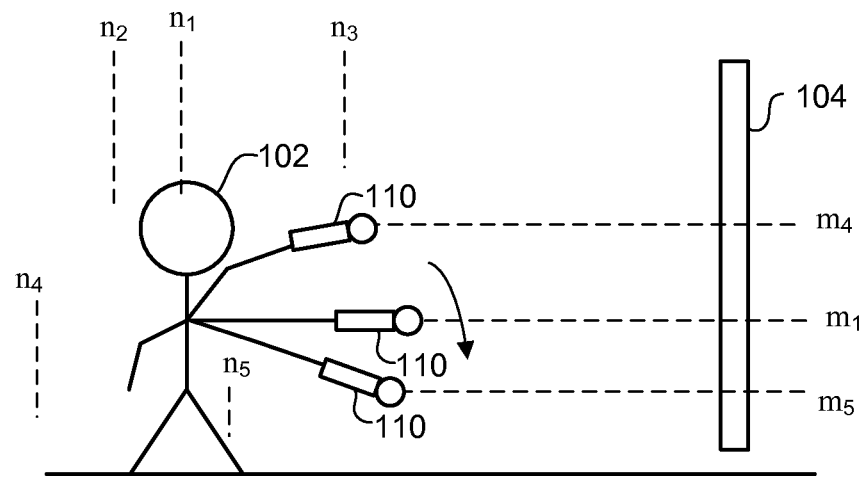
FIG. 10B is a side view of a gaming environment used to determine whether a user performs an overarm motion to throw an object image, in accordance with one embodiment of the present invention.

FIGS. 10A and 10B are side views of embodiments of a gaming environment used to determine whether a user applies an overarm or underarm motion to throw an object image. It should be noted that in one embodiment, data regarding motion of the tracked object 110 is received by the computer 108 from the tracked object 110 or from the image capture device 106 (FIG. 1). The motion data includes data regarding a pickup object location and data collected after reaching the pickup object location until a release location is reached. The pickup object location is a location of the tracked object 110 at which the user 102 selects a button on the tracked object 110 to pick up, e.g., hold, an object image on the display 104. When the image is held, the image moves with a motion of the tracked object 110. The release location is a location at which the image is released from being held. For example, a button on the tracked object 110 is released to release the image. When an image is released, the image stops moving with a motion of the tracked object 110.

The computer 108 determines multiple criteria related to the motion of the tracked object 110. For example, the computer 108 determines a multidirectional criterion independent of the pickup object location of the tracked object and one or more of a sample-based criterion, a direction-based criterion, and a depth-based criterion. Each of the sample-based criterion, the direction-based criterion and the depth-based criterion are determined using the pickup object location of the tracked object. The multidirectional criterion is determined without a need to use the pickup object location of the tracked object. In one embodiment, instead of the multidirectional criterion, a bounce criterion is determined.

To determine the multidirectional criterion, in one embodiment, the computer 108 determines whether the motion of the tracked object 110 occurs from a first location below and away from a reference location via a second location below and toward the reference location and via a third location above and away from the reference location to a fourth location above and toward the reference location. Examples of the reference location include an (x, y, z) point, e.g., (0, 0, 0), that is located at a corner of the display 104, an (x, y, z) point, e.g., (0, 0, 0), that is located at a corner of a room in which the user 102 is playing a game with the tracked object 110 and the display 104, etc. In one embodiment, the reference location is other than, e.g., not the same as, the pickup object location. It should be noted that in one embodiment, a location is away from the reference location or toward the reference location along a z-axis passing through the reference location. It should further be noted that in an embodiment, a location is above or below the reference location along a y-axis passing through the reference location.

In one embodiment, a direction in which a tracked object 110 is located with respect to the reference location, e.g., toward the reference location, away from the reference location, above the reference location, below the reference location, etc., is determined based on a direction in which a predetermined number of latest samples that are collected to reach the location of the tracked object 110. For example, when three or more samples are collected latest in time to reach a location of the tracked object 110 and the three samples are collected along the z-axis away from the reference location, it is determined that the location of the tracked object 110 is in a direction away from the reference location. As another, when three or more samples are collected latest to reach a location of the tracked object 110 and the three samples are collected along the y-axis below from the reference location, it is determined that the location of the tracked object 110 is in a direction below the reference location.

Moreover, to determine the multidirectional criterion, in an embodiment, the computer 108 determines whether the motion of the tracked object 110 occurs from a fifth location below and away from the reference location via a sixth location below and toward the reference location and via a seventh location above and toward the reference location to an eighth location above and away from the reference location. Also, to determine the multidirectional criterion, in one embodiment, it is determined whether the motion of the tracked object 110 occurs from a ninth location above and away from the reference location via a tenth location above and toward the reference location and via an eleventh location below and away from the reference location to a twelfth location below and toward the reference location. Furthermore, to determine the multidirectional criterion, in an embodiment, the computer 108 determines whether the motion of the tracked object 110 occurs from a thirteenth location above and away from the reference location via a fourteenth location above and toward the reference location and via a fifteenth location below and toward the reference location to a sixteenth location below and away from the reference location.

In response to determining that the motion of the tracked object 110 occurs from the first location via the second and third locations to the fourth location, the computer 108 determines that an overarm motion of the tracked object 110 occurs. Moreover, in response to determining that the motion of the tracked object 110 occurs from the fifth location via the sixth and seventh locations to the eighth location, the computer 108 determines that an overarm motion of the tracked object 110 occurs.

It should be noted that although the motion from the seventh to the eighth location usually does not occur in case of overarm motion, the Bias For Success module 420 applies a bias to the motion from the seventh location to the eighth location to reverse a direction of the motion and provides a signal to the Game Logic 244 to move an image as if the overarm motion occurred. For example, an image would have moved in one direction in case of the motion from the seventh to the eight location without applying bias. In this example, when the bias is applied, the image moves in an opposite direction.

Upon determining that the motion of the tracked object 110 occurs from the ninth location via the tenth and eleventh locations to the twelfth location, the computer 108 determines that an underarm motion of the tracked object 110 occurred. Moreover, in response to determining that the motion of the tracked object 110 occurs from the tracked object 110 occurs from the thirteenth location via the fourteenth and fifteenth locations to the sixteenth location, the computer 108 determines that an underarm motion of the tracked object 110 occurs. It should be noted that although the motion from the fifteenth to the sixteenth location usually does not occur in case of underarm motion, the Bias For Success module 420 applies a bias to the motion to reverse a direction of the motion and provides a signal to the Game Logic 244 to move an image as if the underarm motion occurred.

It should be noted that the first, fifth, ninth, or thirteenth location is reached at or after reaching a pick-up object location and the fourth, eighth, twelfth, or sixteenth location is reached at or before, e.g., immediately before, reaching a release location. For example, no sample motion data is collected by the computer 108 between the release location and the fourth, eight, twelfth, or sixteenth location.

To determine the depth-based criterion, in one embodiment, the computer 108 determines whether a first location of the tracked object 110 is away from the reference location compared to a second location of the tracked object 110. The first location is reached before or after reaching the second location and the first and second locations are reached after reaching the pickup object location. Moreover, the release location is reached immediately after the first location or second location that is reached later in time.

Also, upon determining that the first location is away the reference location compared to the second location, the computer 108 determines whether the first location is above or below the pickup object location. In response to determination that the first location is above the pickup object location, the computer 108 determines that the motion of the tracked object 110 is an overarm motion. On the other hand, in response to determining that the first location is below the pickup object location, the computer 108 determines that the motion of the tracked object 110 is an underarm motion.

When the user 102 is performing neither overarm nor underarm motion, the tracked object 110 is at a position $m_1$.

Referring to FIG. 10A, to determine the direction-based criterion, Game Logic 244 (FIG. 4B) prompts the user 102 to select a button on the tracked object 110 at position $m_1$ to pick up an object image and release the button on the tracked object 110 at position $m_3$ to throw the object image. The user may select the button when the tracked object 110 is at the position $m_1$ to pick up an object image, such as a baseball. Upon selecting the button, the user 102 moves his/her arm to move tracked object 110 from the position $m_1$ to position $m_2$ further to the position $m_3$ and releases the button. Upon releasing the button, the Bias For Success module 420 determines that the tracked object 110 bounced from the position $m_2$, which is below the position $m_1$, to the position $m_3$, which is above the position $m_1$. Moreover, the Bias for Success module 420 determines that a distance between the positions $m_2$ and $m_1$ is greater than a distance between the positions $m_1$ and $m_3$. Accordingly, upon determining that the distance between the positions $m_2$ and $m_1$ is greater than a distance between the positions $m_1$ and $m_3$, the Bias For Success module 420 determines that the user performed an underarm motion to throw an object image.

In other embodiments, to determine the sample-based criterion, the Game Logic 244 determines that a number of position data samples sampled by track position data module 410 (FIG. 4B) between positions $m_2$ and $m_1$ is greater than a number of position data samples sampled between positions $m_1$ and $m_3$ when the tracked object 110 moves from position $m_2$ after selecting the button to the position $m_3$. The button is released at or immediately after the position $m_3$. Upon determining that the number of samples is greater, Bias For Success module 420 determines that the user 102 performed an underarm motion to throw an object image. Referring to FIG. 10B, to determine the direction-based criterion, the Game Logic 244 prompts the user 102 to select a button on the tracked object 110 at position $m_1$ to pick up an object image and release the button on the tracked object 110 at position $m_5$ to throw the object image. Upon selecting the button, the user 102 bounces his/her arm to move tracked object 110 from the position $m_1$ to position $m_4$ further to the position $m_5$ and releases the button. Upon releasing the button, the Game Logic 244 determines that the tracked object 110 bounced from the position $m_4$, which is above the position $m_1$ to the position $m_5$, which is below the position $m_1$. Moreover, the Game Logic 244 determines that a distance between the positions $m_4$ and $m_1$ is greater than a distance between the positions $m_1$ and $m_5$. Accordingly, upon determining that the distance between the positions $m_4$ and $m_1$ is greater than a distance between the positions $m_1$ and $m_5$, the Game Logic 244 determines that the user performed an overarm motion to throw an object image.

In other embodiments, to determine the sample-based criterion, Game Logic 244 determines that a number of position data samples sampled by track position data module 410 between positions $m_4$ and $m_1$ is greater than a number of position data samples sampled between positions $m_1$ and $m_5$ when the tracked object 110 moves from position $m_4$ after selecting the button to the position $m_5$. The button is released at the position $m_5$. Upon determining that the number of samples is greater, Game Logic 244 determines that the user 102 performed an overarm motion to throw an object image.

It should be noted that in some embodiments, to determine the sample-based criterion, the Game Logic 244 determines whether a number of samples sampled between a position $n_1$ and a position $n_3$ in front of the position $n_1$ is greater than a number of samples sampled between the position $n_1$ and a position $n_2$ behind the position $n_1$. In response to determining that the number of samples is greater, the Game Logic 244 determines that the user 102 performed an overarm motion. On the other hand, upon determining that a number of samples sampled between the position n1 and a position $n_4$ behind the position $n_1$ is greater than a number of samples sampled between the position $n_1$ and a position $n_5$ in front of the position $n_1$, the Bias For Success module 420 determines that the user 102 performed an underarm motion.

In some embodiments, to obtain the bounce criterion, the user 102 performs more than two bounces with the tracked object 110. For example, the user 102 moves the tracked object 110 from the position $m_2$ to the position $m_3$ but decides to avoid releasing the button at the position $m_3$. Rather, the user 102 decides to further move the tracked object 110 from the position $m_3$ to the position $m_5$ and then releases the button. In such case, three bounces have occurred. One at the position $m_2$, another at the position $m_3$, and yet another bounce at the position $m_5$. Gearing Table Generator 418 (FIG. 4B) may store position data for all the three bounces in the underarm/overarm gearing table 419c. However, the Bias For Success Module 420 (FIG. 4B) sends the position data for the last two bounces, e.g., the bounce at position $m_3$ and the bounce at the position $m_5$, to provide to the Bias Applicator Module 422, and ignores the position data for the bounce at the position $m_2$. Bias Applicator Module 422 applies the last two bounces to Game Logic 244.

Bias For Success module 420 determines whether an overarm or an underarm motion occurred based on the last two bounces. For example, Bias For Success module 420 determines that to perform the bounces at the positions $m_3$ and the position $m_5$, the tracked object 110 went from the position $m_3$ to the position $m_5$. Because the position $m_3$ is above the position $m_1$ and the position $m_5$ is below the position $m_1$, an overarm motion was performed by the user 102. It should be noted that any number of bounces can be used to determine whether user 102 performed an underarm or overarm motion. For example, last three or last four bounces can be used instead of last two. Of course, a total number of bounces are greater than those used to determine whether user 102 performed an overarm or underarm motion. For example, last three bounces are used to determine whether the user 102 performed an overarm or underarm motion if more than three bounces are performed.

In several embodiments, Bias For Success module 420 assigns a weight to the samples sampled between positions $m_2$ and $m_1$, a weight to the samples sampled between positions $m_1$ and $m_3$, a weight to the samples sampled between positions $m_4$ and $m_1$, a weight to the samples sampled between positions $m_1$ and $m_5$, a weight to the samples sampled between positions $n_2$ and $n_1$, a weight to the samples sampled between positions $n_1$ and $n_3$, a weight to the samples sampled between positions $n_4$ and $n_1$, a weight to the samples sampled between positions $n_1$ and $n_5$, and/or a weight to all of the bounces to determine whether an overarm or underarm motion was performed by the user 102. The weights are stored in Gearing Table storage 418. The weighted samples and/or the weighted bounces are provided to Bias Applicator module 422 that applies a bias based on the weighted samples and/or the weighted bounces. Display 104 displays a game of Game Logic 244 according to the weighted samples and/or weighted bounces.

Upon determining the multiple criteria, the computer 108 assigns predetermined weights to the criteria. For example, the computer 108 multiplies a first weight with the multidirectional criterion to generate a first result, a second weight with the sample-based criterion to generate a second result, a third weight with the direction-based criterion to generate a third result, and a fourth weight with the depth-based criterion to generate a fourth result. The computer 108 determines whether a sum of the criteria with the assigned weights exceeds a threshold. For example, the computer 108 generates a sum of the first, second, third, and fourth results and determines whether the sum exceeds the threshold. Upon determining that the sum exceeds the threshold, the computer 108 determines that an overarm motion of the tracked object 110 occurred. On the other hand, upon determining that the sum does not exceed the threshold, the computer 108 determines that an underarm motion of the tracked object 110 occurred.

In one embodiment in which the computer 108 cannot determine whether an overarm or an underarm motion occurred, the computer 108 uses a default, which indicates that an underarm or an overarm motion occurred. For example, upon determining that the sum is equal to the threshold, the computer 108 determines that the motion is a default motion, e.g., overarm motion or underarm motion.

Figure 11:
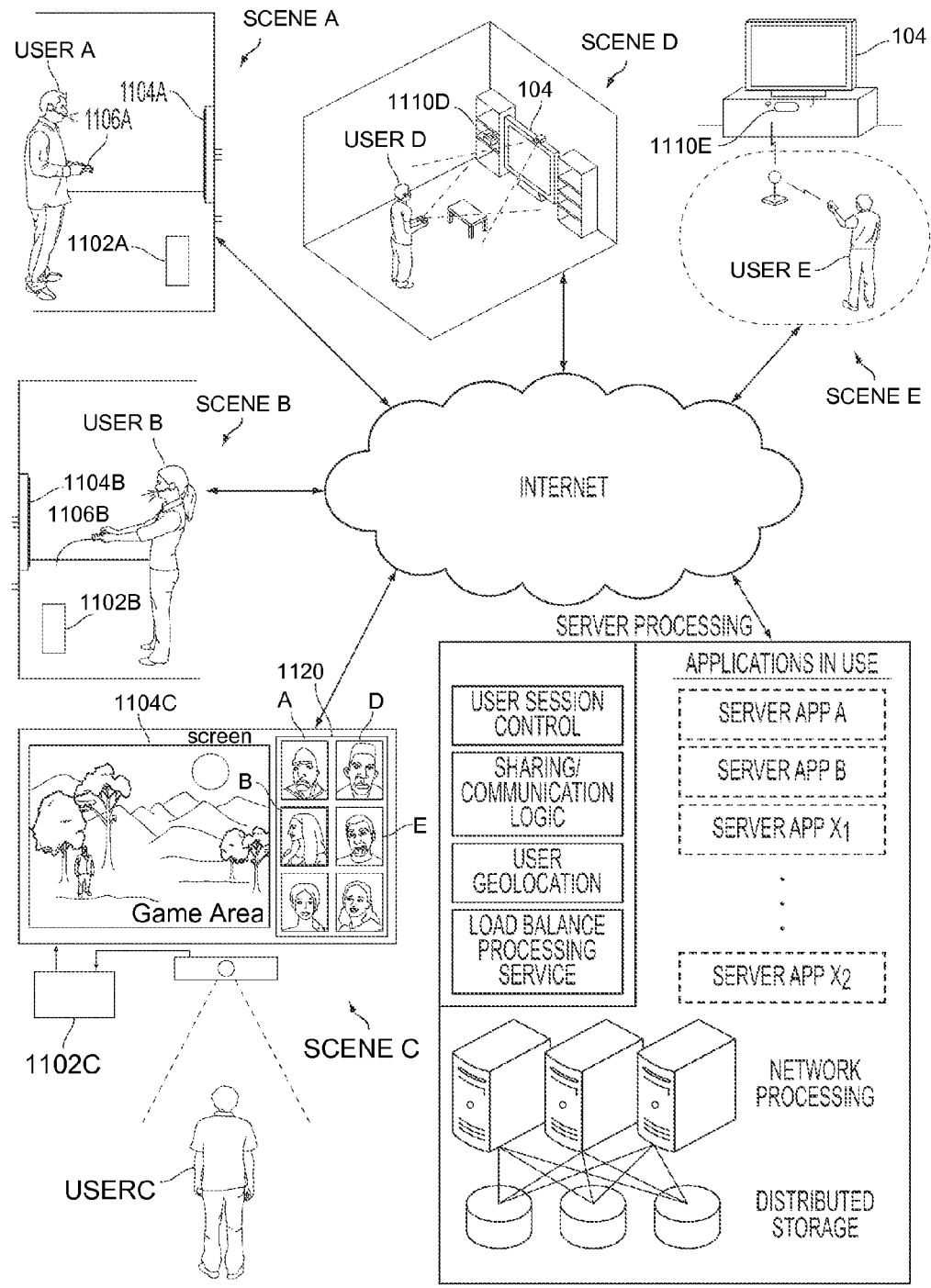
FIG. 11 is an exemplary illustration of scene A through scene E with respective user A through user E interacting with game clients that are connected to server processing via the internet, in accordance with one embodiment of the present invention.

FIG. 11 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as voice over Internet protocol (VOIP), text chat protocols, and email.

A user interacts with the game client via controller. In some embodiments the controller is a game client specific controller while in other embodiments, the controller can be a keyboard and mouse combination. In one embodiment, the game client is a stand-alone device capable of outputting audio and video signals to create a multimedia environment through a monitor/television and associated audio equipment. For example, the game client can be, but is not limited to a thin client, an internal Peripheral Component Interconnect-express (PCI-express) card, an external PCI-express device, an ExpressCard device, an internal, external, or wireless USB device, or a Firewire device, etc. In other embodiments, the game client is integrated with a television or other multimedia device such as a digital video recorder (DVR), Blu-Ray player, digital video disc (DVD) player or multi-channel receiver.

Within scene A of FIG. 11, user A interacts with a client application displayed on a monitor 1104A using a controller 1106A paired with game client 1102A. Similarly, within scene B, user B interacts with another client application that is displayed on monitor 1104B using a controller 1106B paired with game client 1102B. Scene C illustrates a view from behind user C as he looks at a monitor displaying a game and buddy list from the game client 1102C. While a single server processing module is shown, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples of items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 1104C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment, two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E, respectively. Each game console 1110D and 1110E are connected to the server processing module and illustrate a network where the server processing modules coordinates game play for both game consoles and game clients.

Figure 12:
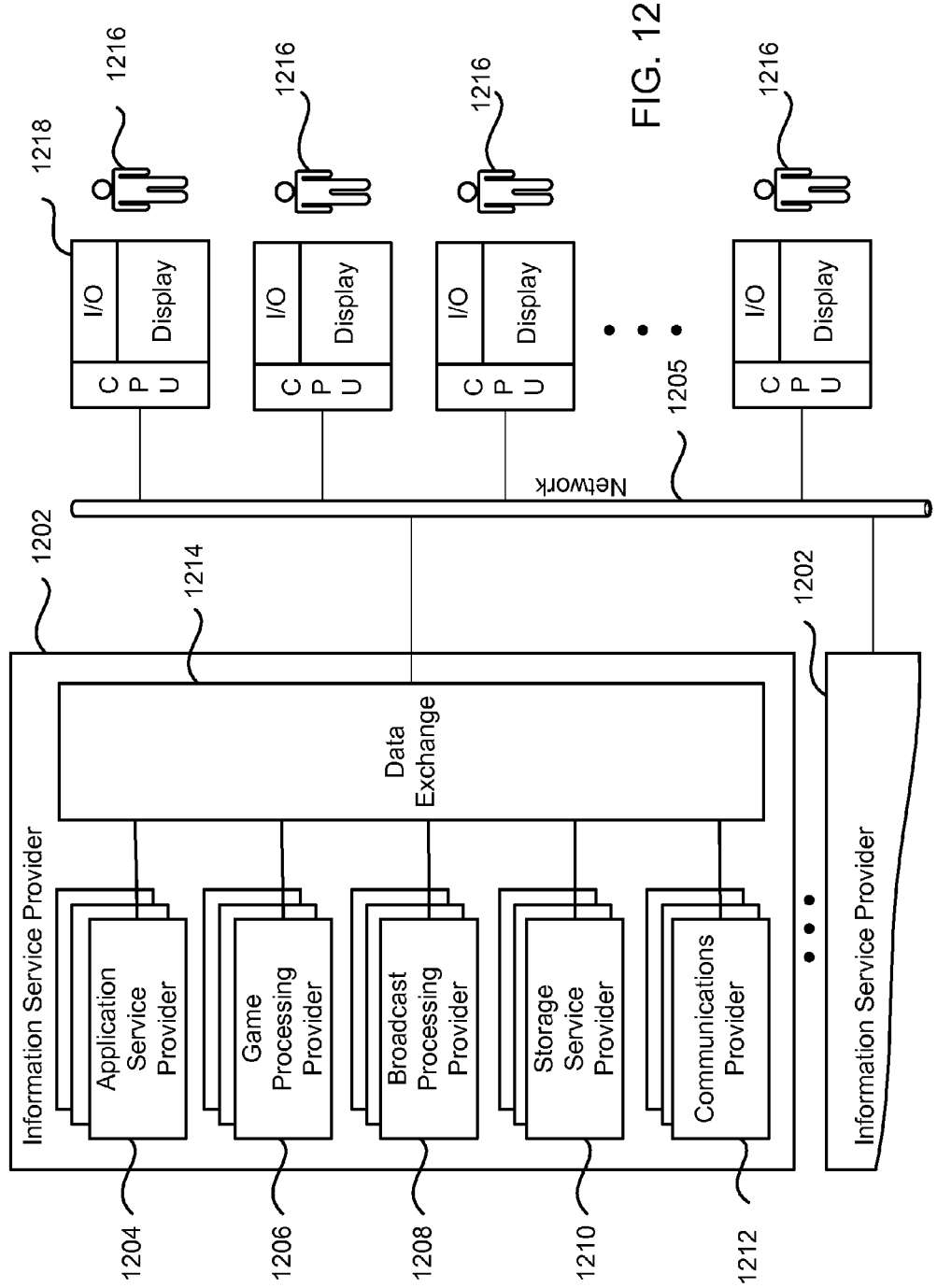
FIG. 12 illustrates an embodiment of an Information Service Provider architecture.

FIG. 12 illustrates an embodiment of an Information Service Provider architecture. Information Service Providers (ISP) 1202 delivers a multitude of information services to users 1216 geographically dispersed and connected via network 1205. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 1202 includes Application Service Provider (ASP) 1204, which provides computer-based services to customers over a network. Software offered using an ASP model is also sometimes called on-demand software or software as a service (SaaS). A simple form of providing access to a particular application program (such as customer relationship management) is by using a standard protocol such as Hypertext Transfer protocol (HTTP). The application software resides on the vendor's system and is accessed by users through a web browser using Hypertext markup language (HTML), by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 1202 includes a Game Processing Server (GPS) 1206 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1208 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1210 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1212 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, digital subscriber line (DSL), cable modem, wireless or dedicated high-speed interconnects. The Communications Provider can also provide messaging services, such as e-mail, instant messaging, and short message service (SMS) texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1214 interconnects the several modules inside ISP 1202 and connects these modules to users 1216 via network 1205. Data Exchange 1214 can cover a small area where all the modules of ISP 1202 are in close proximity, or can cover a large geographic area when the different modules are geographically dispersed. For example, Data Exchange 1214 can include a fast Gigabit Ethernet (or faster) within a cabinet of a data center, or an intercontinental virtual area network (VLAN).

Users 1216 access the remote services with client device 1218, which includes at least a CPU, a display and input/output (I/O). The client device can be a PC, a mobile phone, a netbook, a Personal Digital Assistant (PDA), etc. In one embodiment, ISP 1202 recognizes the type of device used by the client and adjusts the communication method employed. In other cases, client devices use a standard communications method, such as HTML, to access ISP 1202.

Figure 13:
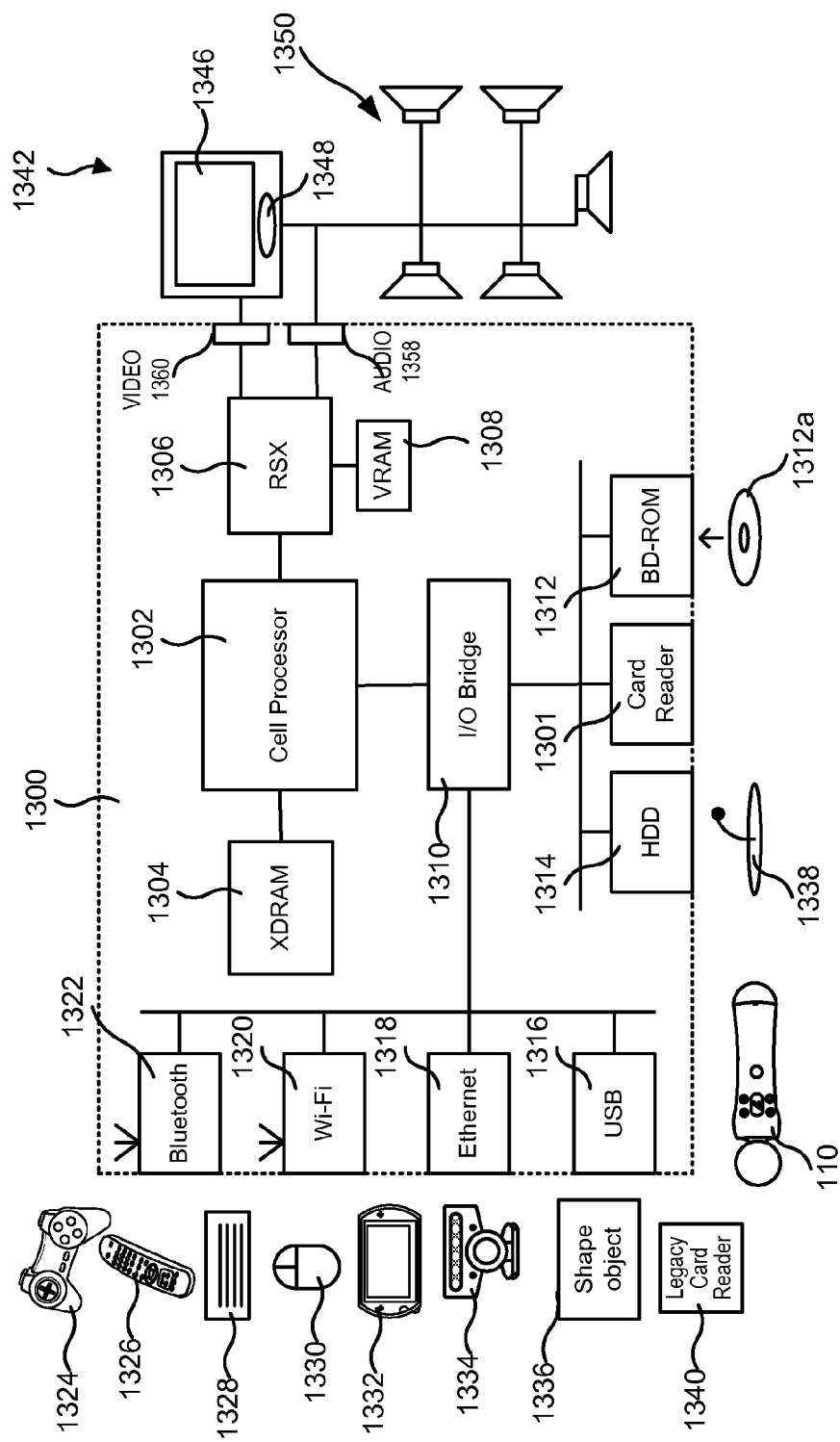
FIG. 13 illustrates hardware and user interfaces that may be used to provide interactivity, in accordance with one embodiment of the present invention.

FIG. 13 illustrates hardware and user interfaces that may be used to implement embodiments of the invention. FIG. 13 schematically illustrates the overall system architecture of the Sony® PlayStation 3® entertainment device. A system unit 1300 is provided, with various peripheral devices connectable to the system unit 1300. The system unit 1300 includes: a Cell processor 1302; a Rambus® dynamic random access memory (XDRAM) unit 1304; a Reality Synthesizer graphics unit 1306 with a dedicated video random access memory (VRAM) unit 1308; and an I/O bridge 1310. The system unit 1300 also comprises a Blu Ray® Disk BD-ROM® optical disk reader 1312 for reading from a disk 1312*a* and a removable slot-in hard disk drive (HDD) 1314, accessible through the I/O bridge 1310. Optionally, the system unit 1300 also comprises a memory card reader 1301 for reading compact flash memory cards, Memory Stick® memory cards and the like, which is similarly accessible through the I/O bridge 1310.

The I/O bridge 1310 also connects to six Universal Serial Bus (USB) 2.0 ports 1316; a gigabit Ethernet port 1318; an IEEE 802.11b/g wireless network (Wi-Fi) port 1320; and a Bluetooth® wireless link port 1322 capable of supporting of up to seven Bluetooth connections.

In operation, the I/O bridge 1310 handles all wireless, USB and Ethernet data, including data from one or more game controllers 110 and 1324. For example, when a user is playing a game, the I/O bridge 1310 receives data from the game controller 110 and 1324 via a Bluetooth link and directs it to the Cell processor 1302, which updates the current state of the game accordingly.

The wireless, USB and Ethernet ports also provide connectivity for other peripheral devices in addition to game controllers 110 and 1324, such as: a remote control 1326; a keyboard 1328; a mouse 1330; a portable entertainment device 1332 such as a Sony PSP® entertainment device; a video camera such as a PlayStation®Eye Camera 1334; a shape object 1336; and a microphone 1338. Such peripheral devices may therefore in principle be connected to the system unit 1300 wirelessly; for example, the portable entertainment device 1330 may communicate via a Wi-Fi ad-hoc connection, while the shape object 1336 may communicate via a Bluetooth link.

The provision of these interfaces means that the PlayStation 3 device is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1340 may be connected to the system unit via a USB port 1316, enabling the reading of memory cards of the kind used by the PlayStation® or PlayStation 2® devices.

The game controllers 110 and 1324 are operable to communicate wirelessly with the system unit 1300 via the Bluetooth link, or to be connected to a USB port, thereby also providing power by which to charge the battery of the game controllers 110 and 1324. Game controllers 110 and 1324 can also include memory, a processor, a memory card reader, permanent memory such as flash memory, light emitters such as an illuminated spherical section, light emitting diodes (LEDs), or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 1324 is a controller designed to be used with two hands, and game controller 110 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1326 is also operable to communicate wirelessly with the system unit 1300 via a Bluetooth link. The remote control 1326 comprises controls suitable for the operation of the Blu Ray™ Disk BD-ROM reader 1312 and for the navigation of disk content.

The Blu Ray™ Disk BD-ROM reader 1312 is operable to read CD-ROMs compatible with the PlayStation and PlayStation 2 devices, in addition to conventional pre-recorded and recordable CDs, and so-called Super Audio CDs. The reader 1312 is also operable to read DVD-ROMs compatible with the Playstation 2 and PlayStation 3 devices, in addition to conventional pre-recorded and recordable DVDs. The reader 1312 is further operable to read BD-ROMs compatible with the PlayStation 3 device, as well as conventional pre-recorded and recordable Blu-Ray Disks.

The system unit 1300 is operable to supply audio and video, either generated or decoded by the PlayStation 3 device via the Reality Synthesizer graphics unit (RSX) 1306, through audio and video connectors to a display and sound output device 1342 such as a monitor or television set having a display 1346 and one or more loudspeakers 1348, or stand-alone speakers 1350. In one embodiment, voice and gaze inputs are utilized to play sound toward specific audio speakers according to the POG of the user. The audio connectors 1358 may include conventional analogue and digital outputs while the video connectors 1360 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1302. The PlayStation 3 device's operating system supports Dolby® 5.1 surround sound, Dolby® Theatre Surround (DTS), and the decoding of 7.1 surround sound from Blu-Ray® disks.

In the present embodiment, the video camera 1334 comprises a single Charge Coupled Device (CCD), an LED indicator, and hardware-based real-time data compression and encoding apparatus so that compressed video data may be transmitted in an appropriate format such as an intra-image based MPEG (motion picture expert group) standard for decoding by the system unit 1300. The camera LED indicator is arranged to illuminate in response to appropriate control data from the system unit 1300, for example to signify adverse lighting conditions. Embodiments of the video camera 1334 may variously connect to the system unit 1300 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may, for example, be incorporated within a game or interpreted as game control inputs. In another embodiment, the camera is an infrared camera suitable for detecting infrared light.

In general, in order for successful data communication to occur with a peripheral device such as a video camera or remote control via one of the communication ports of the system unit 1300, an appropriate piece of software such as a device driver should be provided. Device driver technology is well-known and will not be described in detail here, except to say that the skilled man will be aware that a device driver or similar software interface may be required in the present embodiment described.

Embodiments of the present invention may be practiced with various computer system configurations including hand-held devices, microprocessor systems, microprocessor-based or programmable consumer electronics, minicomputers, mainframe computers and the like. Several embodiments of the present invention can also be practiced in distributed computing environments where tasks are performed by remote processing devices that are linked through a wire-based or wireless network.

With the above embodiments in mind, it should be understood that a number of embodiments of the present invention can employ various computer-implemented operations involving data stored in computer systems. These operations are those requiring physical manipulation of physical quantities. Any of the operations described herein that form part of various embodiments of the present invention are useful machine operations. Several embodiments of the present invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Various embodiments of the present invention can also be embodied as computer readable code on a computer readable medium. The computer readable medium is any data storage device that can store data, which can be thereafter be read by a computer system. Examples of the computer readable medium include hard drives, network attached storage (NAS), read-only memory (ROM), random-access memory, compact disc-ROMs (CD-ROMs), CD-recordables (CD-Rs), CD-rewritables (RWs), magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the various embodiments of the present invention is not to be limited to the details given herein, but may be modified within the scope and equivalents of the appended claims.

What is claimed is:

1. A method comprising:
receiving an identification of a first corner of a display screen from a tracked object by associating a first position of the tracked object with the first corner, the associating of the first position with the first corner performed using image data from a capture device, the tracked object configured to be held by a user;
receiving an identification of a second corner of the display screen from the tracked object by associating a second position of the tracked object with the second corner, the associating of the second position with the second corner performed using image data from the capture device;
triangulating between the first and second corners and the tracked object to define an angle of movement of the tracked object;
defining a height at which the tracked object is held by the user based on the angle of movement, the height defined to set a calibration; and
using the calibration to adjust a motion input provided by the tracked object when utilized by the user,
wherein the method is executed by a processor.

2. The method of claim 1, wherein the angle is formed between two adjacent sides of a triangle, the triangle formed by said triangulation, each adjacent side of the triangle extending via the tracked object.

3. The method of claim 1, wherein the tracked object includes a controller, the controller used to play a game that is displayed on the display screen.

4. The method of claim 1, wherein the two corners are located diagonally opposite to each other.

5. The method of claim 1, wherein the angle of movement is based on a set position of the display screen, a location of the user relative to the display screen, a state of the user, and a stature of the user.

6. The method of claim 1, wherein the height at which the tracked object is held includes an estimate of a distance from the tracked object to a reference location.

7. The method of claim 1, wherein the angle of movement is less when the user is of a shorter stature compared to when the user is of a taller stature, the taller stature longer than the shorter stature.

8. The method of claim 1, wherein the height at which the tracked object is held is defined without receiving a value of the height of the user.

9. A method comprising:
identifying a position of a tracked object in front of a display screen;
generating data regarding prompting a user to identify two or more corners of the display screen and a center of the display screen, wherein the two or more corners include a first corner and a second corner;
receiving an identification of the center of the display screen from the tracked object;
establishing a position of a capture device relative to the display screen using the identification of the center;
receiving an identification of a first corner of a display screen from the tracked object by associating a first position of the tracked object with the first corner, the associating of the first position with the first corner performed using image data from a capture device;
receiving an identification of a second corner of the display screen from the tracked object by associating a second position of the tracked object with the second corner, the associating of the second position with the second corner performed using image data from the capture device;
triangulating between the first and second corners and the tracked object and using the position of the capture device relative to the center of the display screen to define an angle of movement of the tracked object;
defining a height at which the tracked object is held by the user based on the angle of movement, the height defined to set a calibration; and
using the calibration to adjust a motion input provided by the tracked object when utilized by the user,
wherein the method is executed by a processor.

10. The method of claim 9, wherein the angle of movement is based on a set position of the display screen, a location of the user relative to the display screen, a state of the user, and a stature of the user.

* * * * *